United States Patent
Hugi et al.

(10) Patent No.: US 10,027,425 B2
(45) Date of Patent: Jul. 17, 2018

(54) METHOD FOR OPTICAL AND ELECTRICAL SIGNAL PROCESSING OF A MULTI-HETERODYNE SIGNAL GENERATED BY A MULTI-MODE SEMI-CONDUCTOR LASER AND DETECTION DEVICE UTILIZING THAT METHOD

(71) Applicant: ETH Zürich, Zürich (CH)

(72) Inventors: Andreas Hugi, Zürich (CH); Gustavo Filipe Ferreira Villares, Zürich (CH); Jérôme Faist, Zürich (CH)

(73) Assignee: ETH Zurich, Zurich (CH)

( * ) Notice: Subject to any disclaimer, the term of this patent is extended or adjusted under 35 U.S.C. 154(b) by 0 days.

(21) Appl. No.: 15/319,364

(22) PCT Filed: Jun. 16, 2015

(86) PCT No.: PCT/EP2015/063423
§ 371 (c)(1),
(2) Date: Dec. 15, 2016

(87) PCT Pub. No.: WO2015/193282
PCT Pub. Date: Dec. 23, 2015

(65) Prior Publication Data
US 2017/0201328 A1    Jul. 13, 2017

(30) Foreign Application Priority Data
Jun. 16, 2014   (EP) ..................................... 14172614

(51) Int. Cl.
*H04B 10/04*      (2006.01)
*H04B 10/64*      (2013.01)
(Continued)

(52) U.S. Cl.
CPC .............. *H04B 10/64* (2013.01); *G01J 3/433* (2013.01); *G01J 9/0246* (2013.01);
(Continued)

(58) Field of Classification Search
CPC ............ H04B 10/0795; H04B 10/0799; H04B 10/504; H04B 10/505; H04B 10/524;
(Continued)

(56) References Cited

U.S. PATENT DOCUMENTS 5,754,322 A * 5/1998 Ishikawa ............ H04B 10/0795
398/147
5,815,294 A * 9/1998 Ishikawa ............... H04L 7/0037
398/158
(Continued)

FOREIGN PATENT DOCUMENTS

EP          2866314 A1     4/2015

OTHER PUBLICATIONS

Coddington, et al., "Coherent dual-comb spectroscopy at high signal-to-noise ratio," Oct. 12, 2010 (14 pages).
(Continued)

*Primary Examiner* — Hibret Woldekidan
(74) *Attorney, Agent, or Firm* — Patent Law Works LLP

(57) ABSTRACT

A method for optical and electrical signal processing of a multi-heterodyne signal generated by a multi-mode semi-conductor laser, for a system comprising two laser sources and an sample interaction unit. At least the beam of one of the laser passes through said sample interaction unit before being combined on a detector. The first laser is tuned (40=>42) by an amount keeping the tuning result within the available detector bandwidth (55). Then the second laser is roughly tuned by the same amount as the tuning of the first laser to bring back the signal to the vicinity (48) of the original place in the RF-domain and within the bandwidth
(Continued)

(55) of the detector. The tuning steps are repeated with different value of mode spacing for reconstructing the sample spectrum and provide a high resolution image of the dip (41) absorption line (40).

27 Claims, 27 Drawing Sheets

(51) Int. Cl.
    *G01J 3/433* (2006.01)
    *G01J 9/02* (2006.01)
    *H04B 10/50* (2013.01)
    *H04B 10/524* (2013.01)
    *G01J 3/42* (2006.01)

(52) U.S. Cl.
    CPC ......... *H04B 10/504* (2013.01); *H04B 10/505* (2013.01); *H04B 10/524* (2013.01); *G01J 2003/423* (2013.01)

(58) Field of Classification Search
    CPC ................. H04B 10/64; H04B 10/572; H04B 10/07957; H04B 10/675; G01J 3/453; G01J 9/04; G01J 3/433; G01J 9/0246; G01J 2003/423
    USPC ....... 398/158, 162, 154, 204, 140, 192, 195, 398/196, 159, 206
    See application file for complete search history.

(56) References Cited

U.S. PATENT DOCUMENTS

| | | | |
|---|---|---|---|
| 6,909,508 B2 * | 6/2005 | Yamada | G01J 9/00 356/484 |
| 7,649,917 B2 * | 1/2010 | Mullane | H01S 5/0625 372/20 |
| 8,384,990 B2 | 2/2013 | Vodopyanov et al. | |
| 8,983,306 B2 * | 3/2015 | Bernasconi | H04B 10/506 398/195 |
| 2001/0026385 A1 * | 10/2001 | Cao | H04B 10/077 398/79 |
| 2003/0231315 A1 * | 12/2003 | Arbore | G01M 11/331 356/477 |
| 2004/0114149 A1 * | 6/2004 | Einstein | G01J 9/04 356/484 |
| 2005/0180470 A1 * | 8/2005 | Sadot | G01J 9/0246 372/20 |
| 2006/0238762 A1 | 10/2006 | Haensch et al. | |
| 2007/0086713 A1 | 4/2007 | Ingmar et al. | |
| 2009/0092400 A1 * | 4/2009 | Igarashi | G02F 1/3513 398/141 |
| 2010/0225897 A1 | 9/2010 | Fermann et al. | |
| 2011/0069309 A1 * | 3/2011 | Newbury | G01J 3/453 356/326 |
| 2011/0080580 A1 * | 4/2011 | Fermann | G01N 21/31 356/301 |
| 2012/0133931 A1 | 5/2012 | Fermann et al. | |
| 2012/0148233 A1 * | 6/2012 | Eiselt | H04B 10/85 398/28 |
| 2013/0286402 A1 | 10/2013 | Giaccari et al. | |

OTHER PUBLICATIONS

Wang, et al., "High-resolution multi-heterodyne spectroscopy based on Fabry-Perot quantum cascade lasers," Jan. 23, 2014 (5 pages).
International Search Report and Written Opinion for PCT/EP2015/063423, dated Sep. 17, 2015 (12 pages).

* cited by examiner

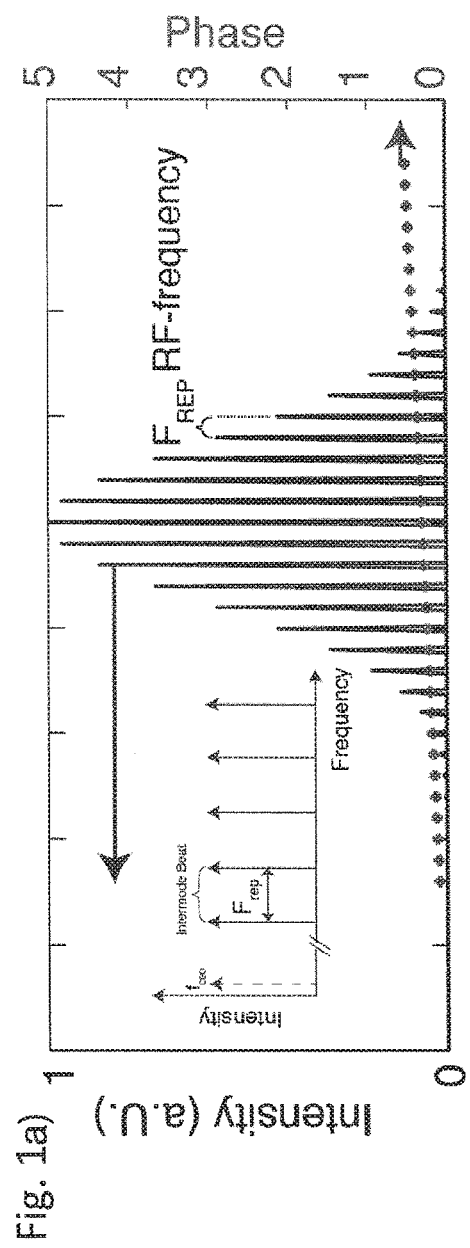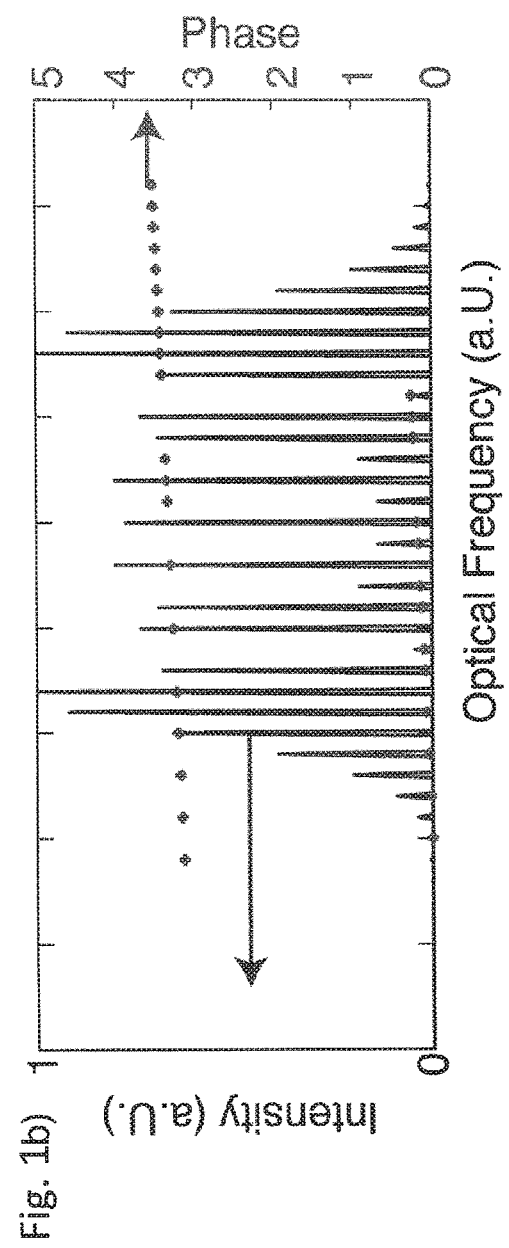

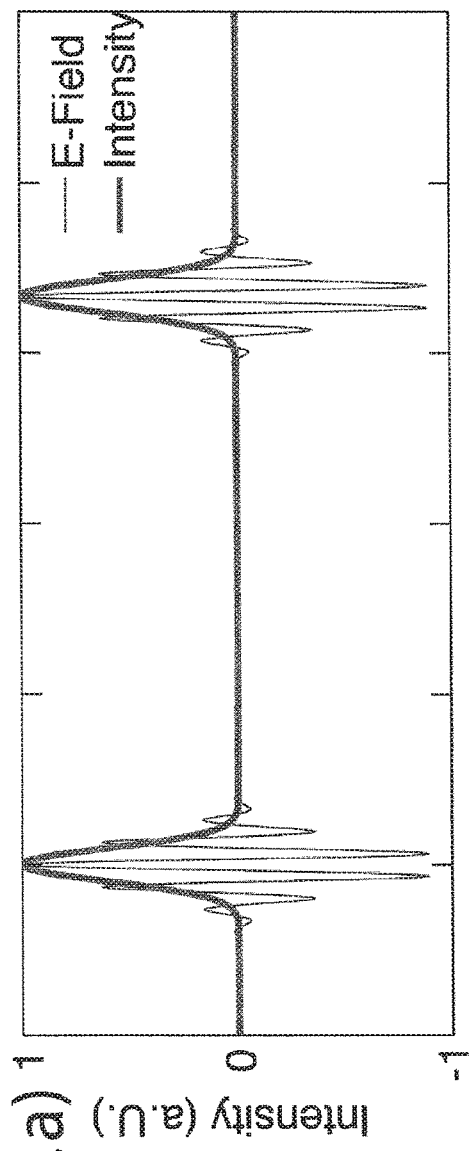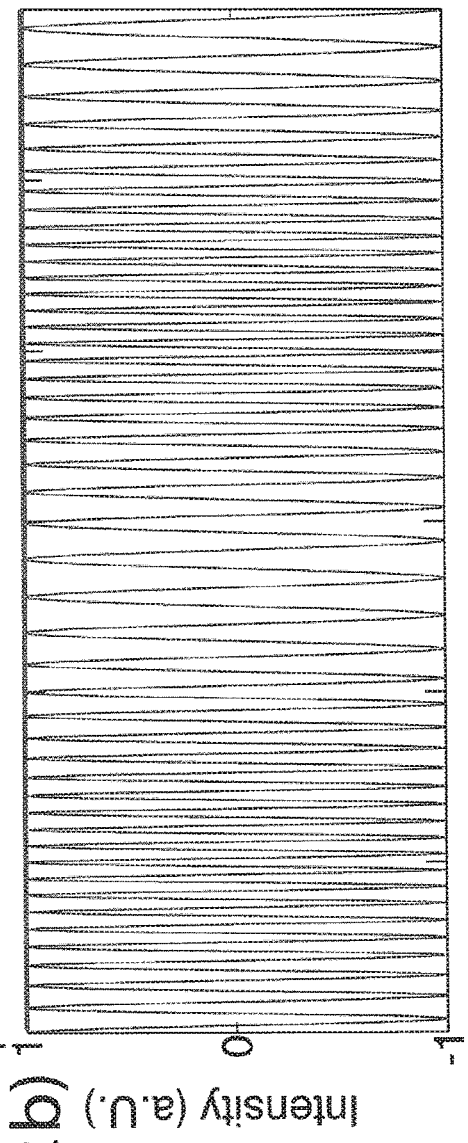

a)
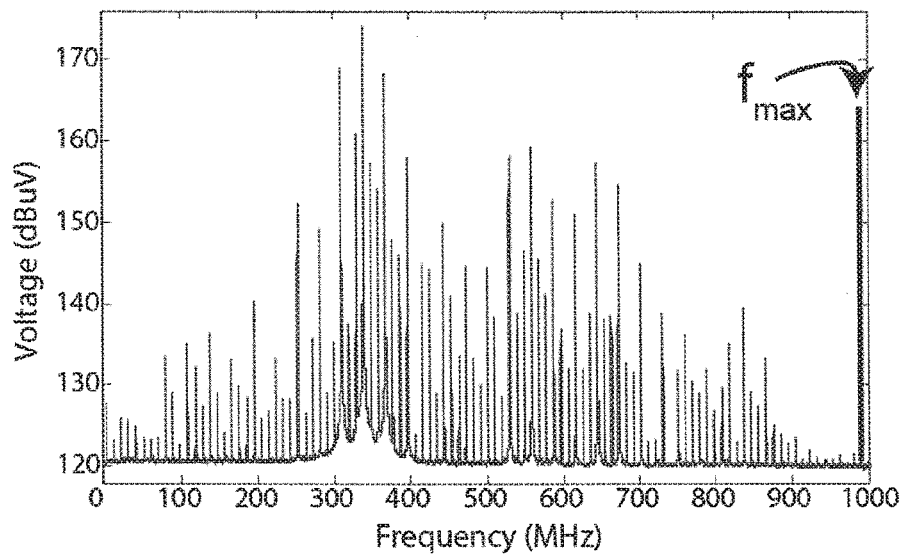
b)
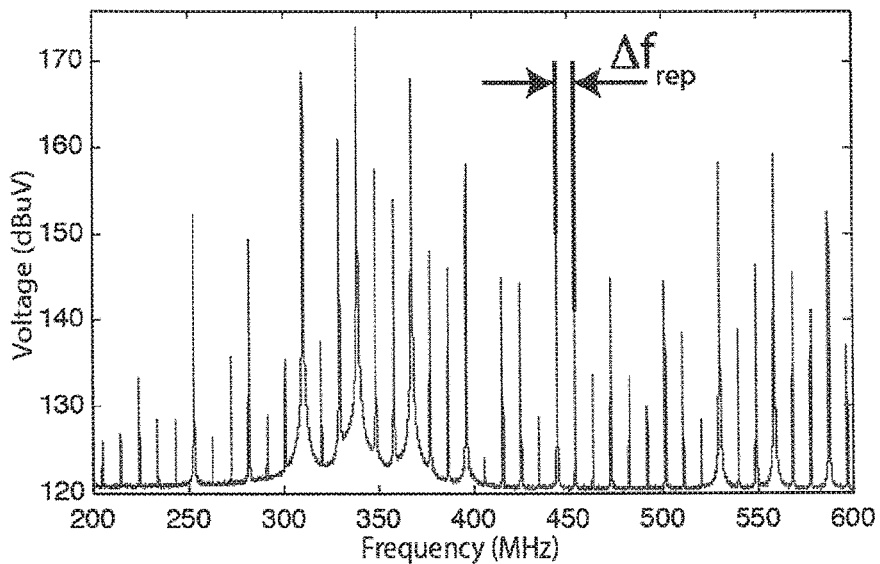
Fig. 6

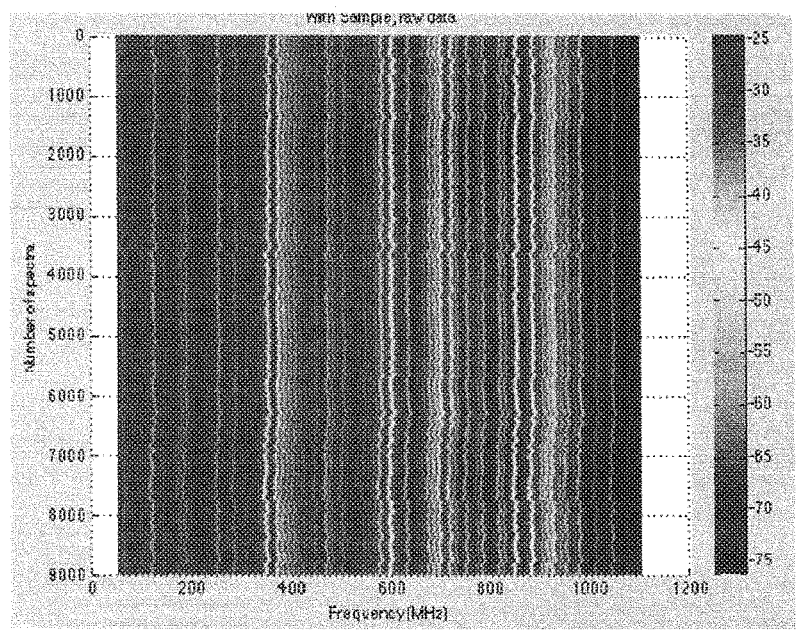
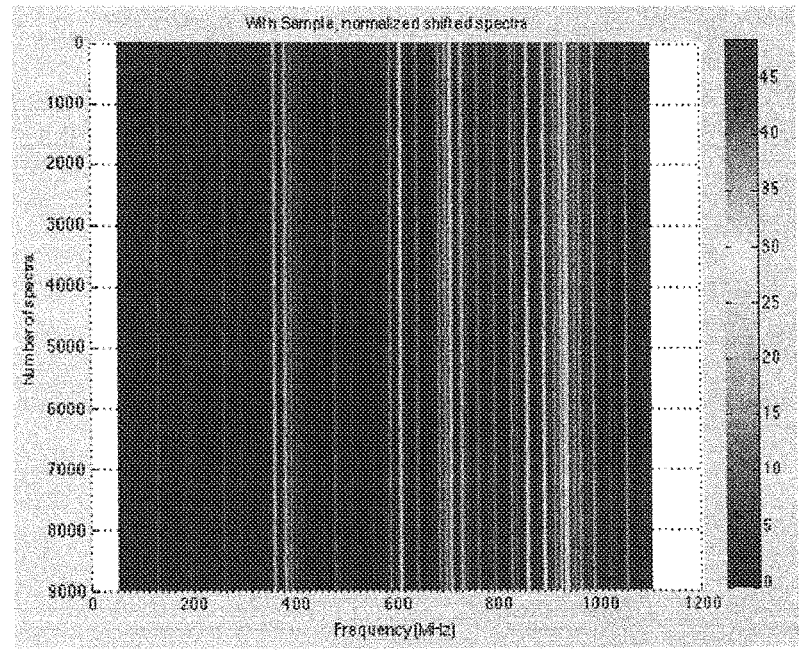
Fig. 10

METHOD FOR OPTICAL AND ELECTRICAL SIGNAL PROCESSING OF A MULTI-HETERODYNE SIGNAL GENERATED BY A MULTI-MODE SEMI-CONDUCTOR LASER AND DETECTION DEVICE UTILIZING THAT METHOD

CROSS REFERENCE TO RELATED APPLICATIONS

This application is a National Stage of International Application No. PCT/EP2015/063423 filed Jun. 16, 2015, entitled "METHOD FOR OPTICAL AND ELECTRICAL SIGNAL PROCESSING OF A MULTI-HETERODYNE SIGNAL GENERATED BY A MULTI-MODE SEMI-CONDUCTOR LASER AND DETECTION DEVICE UTILIZING THAT METHOD", which claims priority to European Application 14172614.1 filed Jun. 16, 2014, all of which are hereby incorporated by reference in their entirety.

TECHNICAL FIELD

The present invention relates to methods for optical and electrical signal processing of a semi-conductor laser and to a detection device utilizing said methods.

PRIOR ART

US 2007/086713 A1 discloses methods to build frequency standards based on mode-locked fiber lasers. Said document is related to applications based on frequency-combs. A comb source is characterized by its perfectly equal spacing of the modes in the frequency domain. The optical frequency of each mode can be characterized as $f_n = f_{ceo} + n \cdot f_{rep}$, with $n \gg 1$. The coherence between individual modes ensures equal mode spacing. The full-width at half maximum FWHM$_{beatnote}$ of the generated beatnote (also called intermode beat) reflects the purity of the coherence between the modes. Someone skilled in the art knows different comb regimes. The comb regime is defined by FWHM$_{beatnote}$<kHz, the comb-like regime is defined by kHz<FWHM$_{beatnote}$<MHz, the Fabry-Pérot regime is defined by FWHM$_{beatnote}$>MHz.

Usually, a fundamentally mode-locked laser source is used to generate an optical frequency comb source. A fundamental mode-locked laser generates a pulse in the time domain. A sample amplitude and phase configuration for such a fundamentally mode-locked laser is shown in FIG. 1a. The phases of the individual modes are equal or linear. This generates a train of pulses separated in the time domain. Fundamentally mode-locked lasers that are employed in prior art multi-heterodyne spectrometer are usually fiber combs or solid-state combs. Sometimes they are based on a chain of optical elements to extend the spectral range in terms of bandwidth and center wave-length. Examples of prior art can be found in various patents as e.g. US 2006/238762 A1, US 2007/086713 A1, US 2010/225897 A1, US 2011/080580 A1 or U.S. Pat. No. 8,384,990 B2.

Someone skilled in the art furthermore uses such combs in multi-heterodyne detection systems and comb sources in the mid-infrared are usually generated by nonlinear down conversion of near-infrared comb sources.

In a quantum-cascade laser (QCL) however, a special kind of semiconductor laser, even in a perfectly locked state, the optical frequency comb emits a continuous-wave output. It is very hard to fundamentally mode-lock a mid-IR quantum cascade laser to produce a train of coherent pulses emitted by the cavity. It was recently shown, that such mid-infrared quantum cascade lasers have a phase locking mechanism, which allows them to be operated in a frequency-comb and comb-like regime. Furthermore, due to strong nonlinearities in their media and the fast gain-recovery process, Fabry-Pérot lasers emit multi-mode emission due to spatial hole-burning. Other geometries with standing-wave patterns also generate a multi-mode emission. The emission in all these cases is however not a pulse of frequencies, but a continuous-wave output, whose multimode output is equally spaced within the measured intermode beat linewidth. The locking mechanisms in these lasers leads to a continuous-wave output with an FM-like amplitude and phase configuration.

This generated optical output can be considered to be FM-like. FIG. 1b shows the amplitude and phase configuration of a perfect FM-comb. The output power of such a laser is almost but not perfectly constant, even though the condition for a frequency-comb $f_n = f_{ceo} + n \cdot f_{rep}$ still holds.

The associated output powers of a fundamentally mode-locked laser and a perfectly FM-mode locked laser is shown in FIGS. 2a and 2b. Even though the comb regime reaches coherence between its modes of <10 Hz (varying between <10 Hz to tens of MHz), the output usually does not modulate by more than 2% of the total power. This locking is called frequency-modulated (FM)-like mode locking. There is clearly an absence of high-intensity pulses at the round-trip frequency.

For clarification: under continuous-wave operation, we understand an output power that is either a periodic output as expected from a laser operated in a frequency-comb or comb-like regime, but whose intensity modulation is small compared to the total output power (0%-50%) with inter-node beat linewidths of <10 Hz to tens of MHz or a laser perfectly constant in a chaotic manner.

A method is known from Wang, et al. "High-Resolution Multi-Heterodyne Spectroscopy Based on Fabry-Pérôt Quantum Cascade Lasers." APL 104, no. 3 (2014): 031114 in which two QCL Fabry-Pérôt devices are used to measure a multi-heterodyne signal. The acquisition and processing of the multi-heterodyne signal is performed using a commercially available RF spectrum analyzer. To scan the QCL signal over an absorption line, a method for high-resolution spectroscopy is shown in which solely the signal laser is tuned by changing its bias current. Especially, the initial setup of Wang comprises tuning of both lasers to overlap the spectrum of the first laser source and the second laser source in order to generate the heterodyne signal in the bandwidth of the detector.

A prior art method is known from Coddington, et al. "Coherent Dual-Comb Spectroscopy at High Signal-to-Noise Ratio." Physical Review A 82, no. 4 (2010): 043817 describing a method for a data-acquisition using two mutually phase-locked combs. The data-acquisition method described utilize the properties of these phase-locked combs. The acquired signal results in a integer number of points with exactly the same phase. This allows them to perform a so called coherent averaging in the time domain.

SUMMARY OF THE INVENTION

Based on this prior art, the present invention relates to optical and electrical signal processing techniques putting into use small semiconductor laser sources generating a multimode-laser output, but featuring a continuous-wave output in a multi-heterodyne spectrometer.

This invention provides a method to realize a high-resolution and ambiguity free multi-heterodyne spectrometer realized with multimode semiconductor lasers, or semiconductor laser combs or any small multimode or comb source based on semiconductor material. This invention is especially relevant for multimode lasers featuring a large mode-spacing (>1 (GHz). Such lasers can be used in a dual-comb setup, a special multiheterodyne spectrometer, realized with quantum-cascade laser frequency combs and comb-like quan-turn-cascade lasers and Fabry-Pérot quantum cascade lasers and any kind of quantum cascade laser producing a multimode laser output.

Due to the small size of monolithically integrated semiconductor frequency combs, in the order of several millimeters or less, these sources have a characteristic mode spacing of several GHz in frequency (>1 GHz) (More than 1 MHz, typically 3-30 GHz, less than 1 THz). In a typical multi-heterodyne spectrometer setup, this mode spacing determines the spectral sampling of the investigated sample and therefore ultimately limit the spectral resolution of the setup. Depending on the application, this limits severely the performance of the system. Depending on the investigated sample, this spectral resolution given by the mode spacing results in a strong spectral undersampling of the acquired data. Furthermore, it leads to an unwanted uncertainty in the measurement. Since the linewidth of a single laser mode $\Delta f_{line}$ is often very narrow (in the present case 100 kHz), it is possible to miss some narrow band features of the sample in question. For example one might miss light molecules or it is impossible to resolve several isotopomers of a molecule. Therefore a method and a system to enable high-resolution spectroscopy with a multi-heterodyne spectrometer based on multimode laser with a large mode-spacing is of paramount interest.

The resulting method, device and complete system overcomes the problems of the prior art and enables the high-resolution spectroscopy with a multi-heterodyne setup. The attainable resolution is independent of the mode-spacing of the multimode laser.

The acquisition of the signal of the detector in the disclosed method can be carried out at different steps. This includes the possibility to measure the signal when both lasers are not tuning before step b). Another possibility is to measure the signal while one laser is tuning in step b), leading to an integrated signal over the tuning range of the said laser. It is also possible to measure after step b) and before step c) when again both lasers are not tuning. Another possibility is to measure the signal when the second laser is tuned during step c), leading to an integrated signal over the tuning range of the second laser. Furthermore, it is possible to acquire the signal when both lasers are tuned simultaneously.

The prior art citation Wang only discloses the method steps a) and b) of claim 1 and does not show further characterizing features of claim 1.

Furthermore, the invention allows resolving unambiguously the mirroring problem of a multi-heterodyne spectrometer. When acquiring a multi-heterodyne measurement, the acquired spectrum can be mirrored in the down-mixed RF-frequency domain. This is very problematic, when running fitting software on the acquired data, for example to determine the concentration of species present in the absorbing sample. The fitting software must be run twice, once on the original data, once on the mirrored data. This slows down the acquisition software and adds a possible error source of the result. The present method, device and system allows to measure and to know the mirroring condition of the multi-heterodyne system before the data analysis is performed, reducing the complexity of the system and enhancing the speed and reliability of the entire device.

The method and device according to the invention discloses a multi-heterodyne detection system whose laser sources are semiconductor multi-mode lasers, which emit a continuous-wave output power instead of a train of pulsed light. The laser sources employed by said multi-mode spectrometer are preferably two multitude quantum-cascade lasers. They are small semiconductor based light sources. Therefore, they are easily and vastly tunable. The electrical tuning of a QCL is usually in the order of 60 GHz for amplitude modulation whereas the bandwidth concerning the frequency modulation of QCL may be much lower. The usual modulation bandwidth of such sources is in excess of hundreds of MHz, with possibility to much higher modulation of hundred of GHz.

Apart from offering new possibilities in acquisition procedures in multi-heterodyne detection systems, the small size and fast tunability of these sources also require measures to overcome the problems due to the small size of the source as drifts in frequency due to small drifts in temperature and/or drive current condition and other external noise sources. Dither in the optical frequency due to current noise and optical feedback and the large mode-spacing in these sources is typically in the GHz range.

The invention provides a method for optical and electrical signal processing of a semi-conductor laser, when the system comprises a first laser source, a second laser source and a sample interaction unit, wherein at least the beam of one of the first and second laser sources passes through said sample interaction unit before being combined on a detector. The first laser source is tuned, wherein the first laser source is only tuned by an amount keeping the tuning result within the available bandwidth of said detector. Then the second laser source is roughly timed by the same amount as the tuning of the first laser source to bring back the signal to the vicinity of the original place in the RF-domain and within the bandwidth of the detector. Finally, the tuning steps are repeated for a number of times for reconstructing the sample spectrum and provide a high resolution image of the dip absorption line.

The tuning result in the available bandwidth of the detector does not need to be composed of the entire multi-heterodyne signal. In order to result in a useful tuning result, at least part of the multi-heterodyne signal needs to be in the available bandwidth of the detector. In principle, one single heterodyne signal in the available bandwidth is sufficient.

The invention furthermore provides and uses preferably a method to reduce the impact of the fast drift and dither arising in small semiconductor laser systems. It is a clear advantage to increase the signal-to-noise ratio of a multi-heterodyne signal generated by a multi-mode semiconductor laser experiencing fast drifts and dithers by aligning individual multi-heterodyne a in the frequency domain establishing a close positive relationship between the two methods. The step of aligning the individual multi-heterodyne spectra in the frequency domain can be done either in the frequency domain or in the time domain. Equivalent data processing, either in the time domain or frequency domain, can also be applied. The use of a time-domain alignment of the data has the advantage of allowing further processing of the signal in the time domain.

The term spectrum is used in the present specification with different meanings, Spectrum can refer to the optical absorption or emission spectrum of a sample, spectrum can refer to the multi-heterodyne spectrum in the RF-domain and spectrum can refer to the multi-mode laser spectrum in the optical domain. A person skilled in the art in this field can easily identify the right meaning of spectrum given the context of the different uses in the specification.

Further embodiments of the invention are laid down in the dependent claims.

Tuning the laser source means changing the output frequency/wavelength of a laser source. In a multimode laser and comb laser, all laser frequencies are changed simultaneously. In a comb laser, this is the same as changing the offset frequency $f_{ceo}$. Tuning the laser frequency in semiconductor lasers is usually achieved by either setting the bias-current of the laser and/or by setting the operation temperature.

As apparent from FIG. 3, all signals used in this method (tracking, error, correction, etc.) originate entirely from the multi-heterodyne signal generated through the two laser comb sources. No additional measurement apparatus is needed to generate an additional signal.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same in the drawings, FIG. 1a shows an amplitude and phase configuration of a perfectly fundamentally mode-locked laser shown in a;

FIG. 1b shows a perfectly FM mode-locked laser, wherein the intensity of a perfectly FM modulated laser is constant;

FIGS. 2a & 2b shows an E-field and intensity configuration of a) a perfectly fundamentally mode-locked and b) a perfectly FM-mode locked laser, wherein the intensity of a perfectly FM-mode locked laser is constant;

FIG. 6 shows a sample multi-heterodyne measurement of two QCL-combs according to an embodiment of the invention;

FIG. 8 shows a multi-heterodyne signal of a signal acquired for 10 ms, wherein FIG. 8a shows the entire spectrum and FIG. 8b shows a zoomed in version to show the wide peaks;

FIG. 10 shows spectral averaging of the signal, wherein in FIG. 10a signal is not corrected for dither/drift and in FIG. 10b signal is corrected for dither/drift;

FIG. 19 shows the existence of mirror ambiguity in multi-heterodyne setups through the comparison between FIG. 19a showing an illustration of a case without the problem of mirroring, whereas FIG. 19b illustrates the case with the problem of mirroring, wherein high frequencies in the optical domain are mapped to low frequencies in the RF domain resulting in a mirrored sampled spectrum, which does not correspond to the direct mapping of the acquired sample;

DESCRIPTION OF PREFERRED EMBODIMENTS

Figure 3:
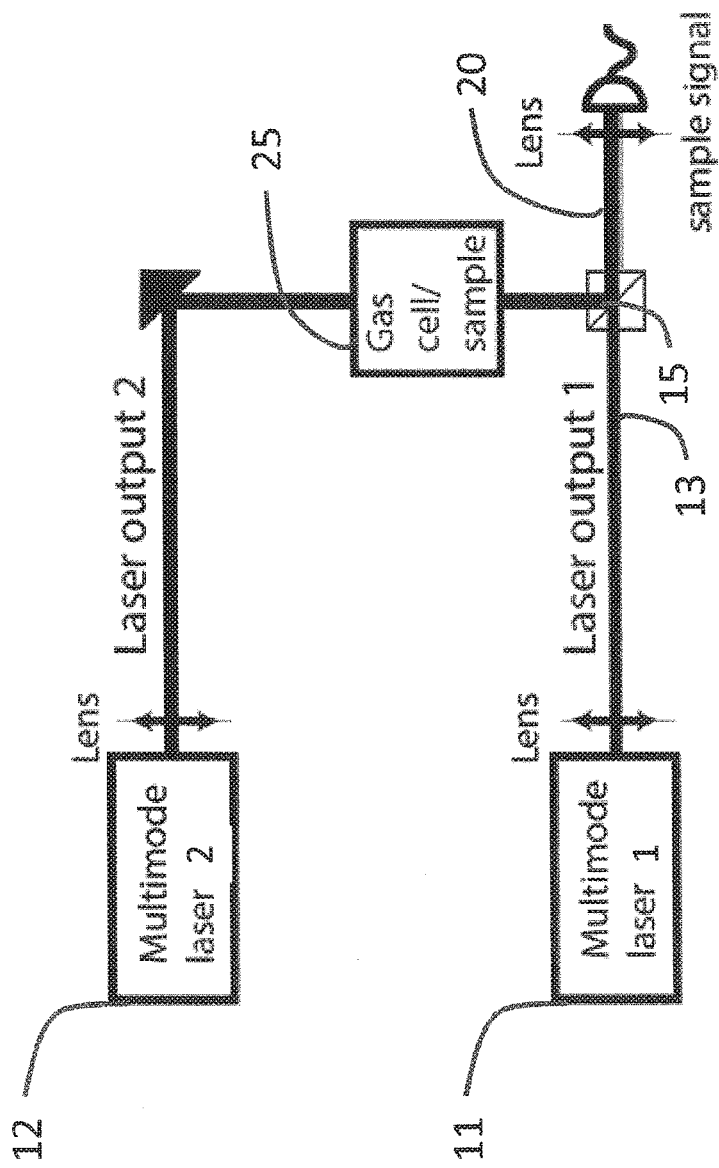
FIG. 3 shows an arrangement of multi-heterodyne setup.

FIG. 3 shows an embodiment of an arrangement of multi-heterodyne setup. As a device setup the arrangement of FIG. 3 is known as prior art. The output of two multimode lasers and/or combs 11, 12 are combined with an optical element 13 to generate a multi-heterodyne beating within beam 15 containing the sample signal of cell 25 on the detector 20.

Such a multi-heterodyne system is built with at least two semiconductor multi-mode sources 11 and 12. A multi-heterodyne spectrometer is based on the readout of the amplitudes and/or relative phases and or frequencies of a multi-heterodyne signal in the RF-domain. This readout gives information about the sample in question. The information includes phase, absorption and emission. As an example, it allows to do spectroscopy. It is useful for optical analysis for substrate and sample analysis and identification. Other implementations include optical communications with a multi-heterodyne setup.

One possible implementation of a multi-heterodyne spectrometer is the dual-comb setup, in which two lasers 11 and 12 operating in a comb regime, beat with each other in the RF-domain as shown in FIG. 3. The outgoing beam of one comb source, here the second laser 12, passes through an absorption cell 25 and or sample; this is called the sample comb laser. Another comb source, here the first laser 11, does not pass through the cell 25 and acts as a local oscillator to generate a multi-heterodyne signal on the detector 20 when both combs are combined on this detector 20. The combination can take place in various ways; here an optical combiner 13 is shown. This signal is then usually acquired and analyzed in the frequency domain. Apart from the amplitude, it is possible to get the phase and frequency information of the measured sample of the heterodyne signal.

The multi-heterodyne spectrometer is however not limited to the use of combs, for example, it is also possible to realize a multi-heterodyne spectrometer by beating two common Fabry-Pérot lasers with each other, or any high-phase noise or partially locked or non-phase locked multimode lasers. This includes multimode QCLs operated in a comb-like or Fabry-Pérot regime. This also includes frequency-combs generated in a micro-cavity comb source. This invention concerns any generation of a multi-heterodyne signal that is generated with one or more multimode lasers output based on semiconductor material.

Generally speaking, both lasers can often be considered as stable lasers, having a drift of 1-10 MHz which can be considered irrelevant in such an application. First laser 11 and second laser 12 are multimode laser.

Figure 4:
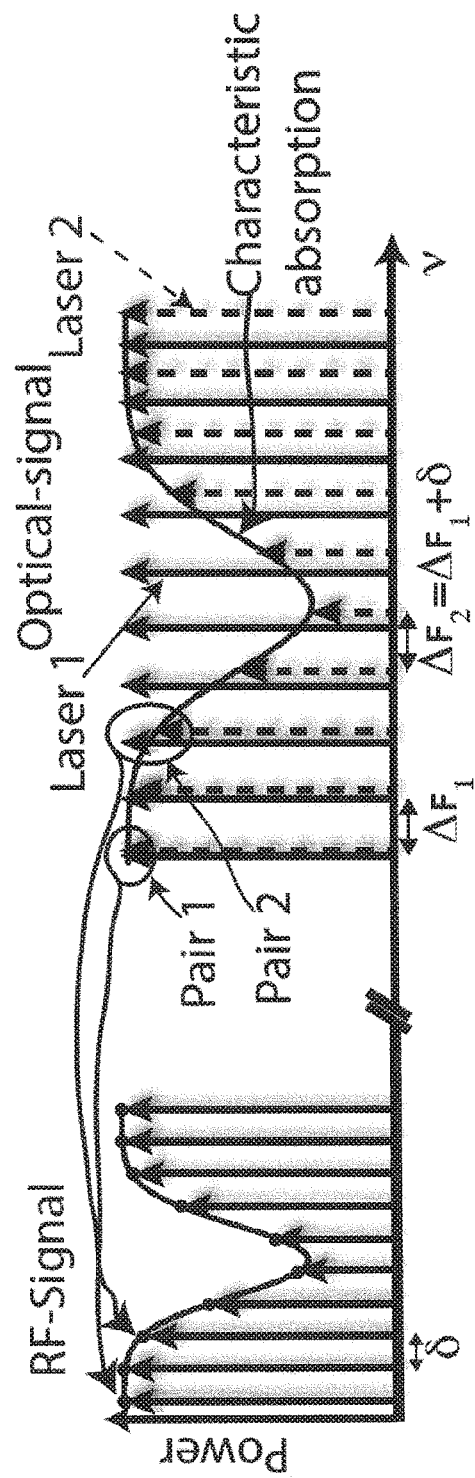
FIG. 4 shows a schematic illustration of the multi-heterodyne detection in the frequency domain.

FIG. 4 shows a schematic illustration of the multi-heterodyne detection in the frequency domain. The two lasers, first laser 11 and second laser 12, have a slightly different mode spacing, or in other words, they have a slightly different repetition frequency $\Delta f_2 = \Delta f_1 + \Delta f_{rep}$. Each arrow, reflecting one laser mode has a width of e.g. 100 kHz. The distance between two modes (e.g. between two dotted arrows or between two fully drawn arrows) is e.g. 7.5 GHz. Therefore, the laser modes of the second laser 12 drift with respect to the first laser 11 in the frequency domain. The two lasers 11 and 12 are afterwards focused on the detector 20; a multi-heterodyne signal is generated, since each pair of comb modes generates a different beating in the frequency domain. This is illustrated for two pairs of comb modes (Pair 1 and 2) in FIG. 4. The optical signals of the first laser 11 are shown as fully drawn lines, whereas the optical signals of the second laser 12 are shown as dashed lines with a slightly higher $\Delta f_2$ compared to $\Delta f_1$. This leads to a direct mapping of the optical signal in an RF-domain that is attainable with electronics.

In the present case one laser signal pass through a characteristic absorption (for example an absorbing molecule in cell 25) in the optical domain, the laser signal of laser 12 is absorbed and less intensity reaches the detector 20. Since the intensity of the optical signal decreases, which reaches the detector 20, the heterodyne beating of the lines corresponding to the absorbed optical frequencies, decrease in the RF-domain. Therefore a direct mapping of the absorption/emission and/or phase of the sample in question in the RF-domain is acquired. It is noted that it would also be possible that both laser signals from lasers 11 and 12 pass through the absorption cell 25 in their path.

It is known to someone skilled in the art that within multi-heterodyne spectrometers, usually two fundamentally mode-locked frequency-combs are overlapped to generate a characteristic beating time-domain interferogram. Usually, two fiber laser or solid-state combs, often spectrally broadened by a nonlinear medium interaction, are used to generate this multi-heterodyne signal. Illustrations of a time domain measurement of such a dual-comb setup can be found in literature, for example FIG. 3 in US 2011/080580 A1 or FIG. 4A in US 2011/080580A1.

Figure 5:
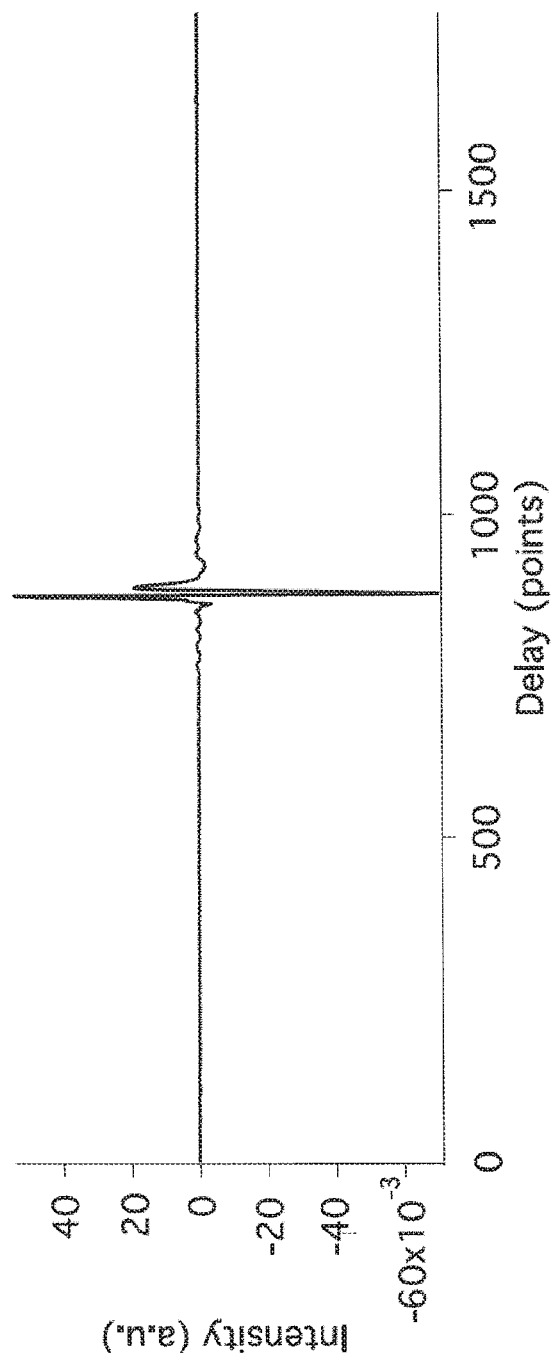
FIG. 5 shows a Fourier-transform interferogram measurement.

The local oscillator comb (LO) is running at a different repetition frequency compared to the source comb, therefore the individual pulses of the two optical train pulses will sweep pass each other at a difference of time $\Delta t = 1/\Delta f_{rep}$. The LO comb therefore samples the source comb. The sampling rate is given by the repetition frequency of the LO comb. Recording this signal of the beating of the two fundamentally mode-locked lasers on the detector 20 features results in an interferogram with a clear centerburst and resembles very strongly a usual interferogram found in Fourier-transform interferogram (FTIRs) shown in FIG. 5.

To improve the signal-to-noise ratio of such dual-comb spectrometers, it is important to generate appropriate signal averaging schemes. Early implementations of dual-comb spectrometers based on two fundamentally-mode locked lasers opted for a brute force acquisition of the time domain signal. The sampling rate was set to an integer of the $\Delta f_{rep}$, and the time-domain signal was multiplied with a periodic Hanning window function. This brute force method however has disadvantages for such laser setups. Dual-comb spectrometers based on fundamentally mode-locked lasers can take advantage of the high-intensity pulses in their laser systems. Advanced sampling techniques take advantage of this knowledge. A possible implementation of this is, that the LO comb acts as a timing signal for the data-acquisition hardware. Additionally phase-locking both combs with each other, this allows generating a coherent time-domain signal, which can be averaged easily resulting in coherent averaging in the time domain. The averaged signal is subsequently transformed to the Fourier-domain via FFT algorithms. Other implementations and patents are focused on the coherent sampling where the sampling time is given by the heterodyne-beating itself, leading to a variable sample-rate and time.

Other possible acquisition procedures are shown in WO 2007/045461 A1.

High resolution spectroscopy, not necessary in a multi-heterodyne fashion, with comb sources is the source of several prior art patents. High-resolution state of the art dual-comb heterodyne setup (called CDSL, coherent dual scanning laser in the invention) is for example described in US 2011/080580 A1. This invention incorporates two mode-locked lasers and two continuous-wave reference laser sources. Various phase-locked loops are incorporated in the presented embodiments to achieve very high-stable sources in the frequency domain. The patent on frequency comb source with large comb spacing discloses small fiber combs with repetition rates in the GHz domain. Disclosed applications include high-resolution spectroscopy with these fiber combs featuring high repetition frequencies. An embodiment presented within this invention covers the possibility to control the tunable output of a fibre-laser comb with optical referencing, for example by beating the comb with a reference source. The spectrum is recorded with a conventional dispersion based spectrometer. The spectrometer features a resolution that is good enough to resolve the high-repetition rate comb. The amount of the fine tuning is then controlled by the generated beating with the reference laser, whereas the spectrum is acquired in the resolution limited dispersion based spectrometer in a sequential fashion. US 2012/133931 A1 uses so-called optical referencing from US 2011/080580 A1. Other optical referencing techniques are disclosed in US 2013/286402 A1 as "referencing of the beating spectra of frequency combs". Optical referencing has the advantage that no precise control over $f_{ceo}$ or $f_{rep}$ is necessary to measure optical drifts in frequency.

Apart from offering new possibilities (due to size and tunability) in acquisition procedures in multi-heterodyne detection systems, the small size and fast tunability in semiconductor based sources for multi-heterodyne detection also entails novel technical difficulties that need to be solved. Some specific problems arising due to the small size of the source that need to be addressed are: increased drifts compared to their solid-state and fiber laser counterparts in frequency due to small drifts in temperature and/or drive current condition. Increased dither compared to their solid-state and fiber laser counterparts in the optical frequency due to current noise and optical feedback and the large mode-spacing compared to their solid-state and fiber laser counterparts in these sources, typically in the GHz range. Spectrometers based on semiconductor lasers that do not solve these technical issues suffer from a reduced sensitivity and resolution.

Small multimode QCL, sources featuring a continuous-wave output open new ways of implementing a compact and small multi-heterodyne spectrometer, which features many advantages over state of the art multi-heterodyne spectrometers. The small size opens the way to fabricate ultra-small, robust and portable sensor systems based on multi-heterodyne detection. Furthermore, the generated interferogram do not show the characteristic centerburst normally present in time-domain interferogram measured with pulsed laser systems. This reduces cumbersome nonlinearities in the detector. However it also entails new challenges on the data-treatment and data-readout compared to state-of the art spectrometers. Due to the FM-like nature of these lasers, the internode beat (beatnote) in such systems cannot be taken as a stable reference trigger or timing clock, making it impossible to implement a coherent-addition of the measured time-domain interferogram. This entails several problems in terms of data-treatment and noise characteristic in such setups, which need to be solved. Also, since the multi-mode quantum-cascade laser is a small semiconductor frequency comb and very easily tunable with temperature and current (tuning ranges of tens of GHz are easily manageable), these sources are strongly affected by external noise sources (e.g. current, temperature, optical feedback) resulting in strong drifts compared with their fiber and solid-state counterparts. The result of this is a fast drift (which can be voluntary due to fast tuning of the laser source or involuntary due to for example temperature drifts) of the signal with time in a multi-heterodyne spectrometer.

If multimode-lasers with constant intensity are used, for example FM-like combs, to generate a multi-heterodyne spectrometer, appropriate acquisition techniques and data-treatment techniques need to be applied, which is especially important for small semiconductor laser based multi-mode lasers, which exhibit a good tuning characteristics of their optical frequency. This good tuning characteristic compared to prior art sources used in multi-heterodyne system is however also responsible for a large frequency drift of the repetition rate of both multimode-lasers. In conventional fundamentally mode-locked lasers, this would be called a strong pulse-to-pulse jitter/drift, leading to problems in averaging the signal. This large frequency drift of $\Delta f_{rep}$ directly leads to a large drift of all the optical modes in the laser spectrum, since $f_n+\Delta f_n=f_{ceo}+n*(f_{rep}+\Delta f_{rep})$, and $\Delta f_n=n*\Delta f_{rep}$, with $\Delta f_n>>\Delta f_{rep}$, since n>>1. This large frequency drift needs to be treated in the acquisition procedure in a multi-heterodyne spectrometer, and common techniques developed for fundamental mode-locked lasers are either not applicable because of the absence of high-energy pulses for trigger purposes or are not the ideal solution in terms of system complexity, system size system stability.

Tuning the laser source means changing the output frequency/wavelength of a laser source. In a multimode laser and comb laser, all laser frequencies are changed simultaneously. In a comb laser, this is the same as changing the offset frequency $f_{ceo}$. Tuning the laser frequency in semiconductor lasers is usually achieved by either setting the bias-current of the laser and/or by setting the operation temperature.

The QCL combs are free-running and are not stabilized. A stabilization procedure, like the one proposed in EP 13005072.7 of the applicant also help to improve the SNR ratio, as the averaging of the signal would become easier.

Since our laser sources in the multi-heterodyne spectrometer do not generate pulsed output, it is impractical or even impossible to take their repetition frequency as an exact timing signal or clock for the acquisition hardware. To overcome this problem the hereby-presented method and device uses a digital-acquisition board with a constant sample-rate that fulfills the Nyquist-Shannon sampling theorem with respect to the measured signal bandwidth ($f_{max}<=2*f_{sample}$). The sample rate $f_{sample}$ has to be at least twice the intended maximal signal bandwidth $f_{max}$ to be captured in the multi-heterodyne spectrum. Adding anti-aliasing filters is an option here.

Figure 7:
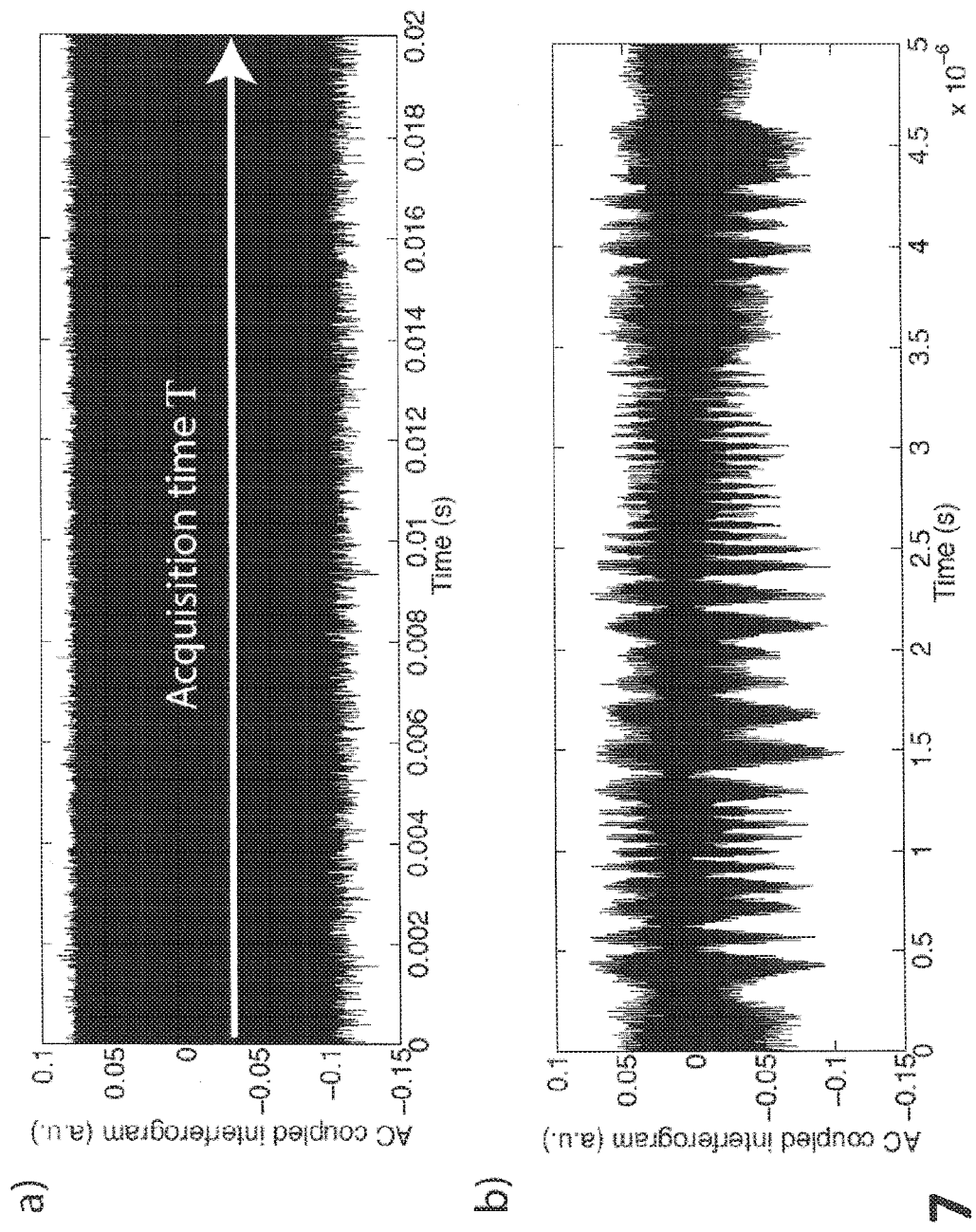
FIG. 7 shows a time domain interferogram of a multi-heterodyne signal acquired with two multimode lasers emitting at an almost constant output power.

FIG. 6 a shows a sample multi-heterodyne measurement acquired with two QCL combs. The method applied to acquire this spectrum is the one proposed within the present invention. The maximum signal bandwidth $f_{max}$ is about 1 GHz. We therefore acquire a continuous signal sampled at least at the double frequency of $f_{max}$ (the present case at 2.5 GHz sample rate, in short GS/S for giga-samples per second). The acquisition time is either a fixed time length or a variable time length or ideally with appropriately fast data treatment continuous. Such an acquired time signal is shown in FIG. 7a. The sampling rate is set to 2.5 GHz, the acquisition bandwidth is 1 GHz, the acquisition time is 20 ms. It can clearly be seen, that the time-domain interferogram is entirely different from conventional interferogram. The time-domain interferogram does not show the characteristic center burst otherwise measured in multi-heterodyne spectrometers realized with fundamentally mode-locked lasers. This is due to the complex phase and amplitude configuration of both the local oscillator 11 and source comb 12. FIG. 7b shows a zoomed section of the time-interferogram. The individual beatings are more clearly visible in this case.

For faster signal processing, this acquisition time length is preferably of length $2^K$, with K being an integer number. If the signal is not of length $2^K$, the signal is preferably extended or shortened to the closest length fulfilling $2^K$.

Figure 8:
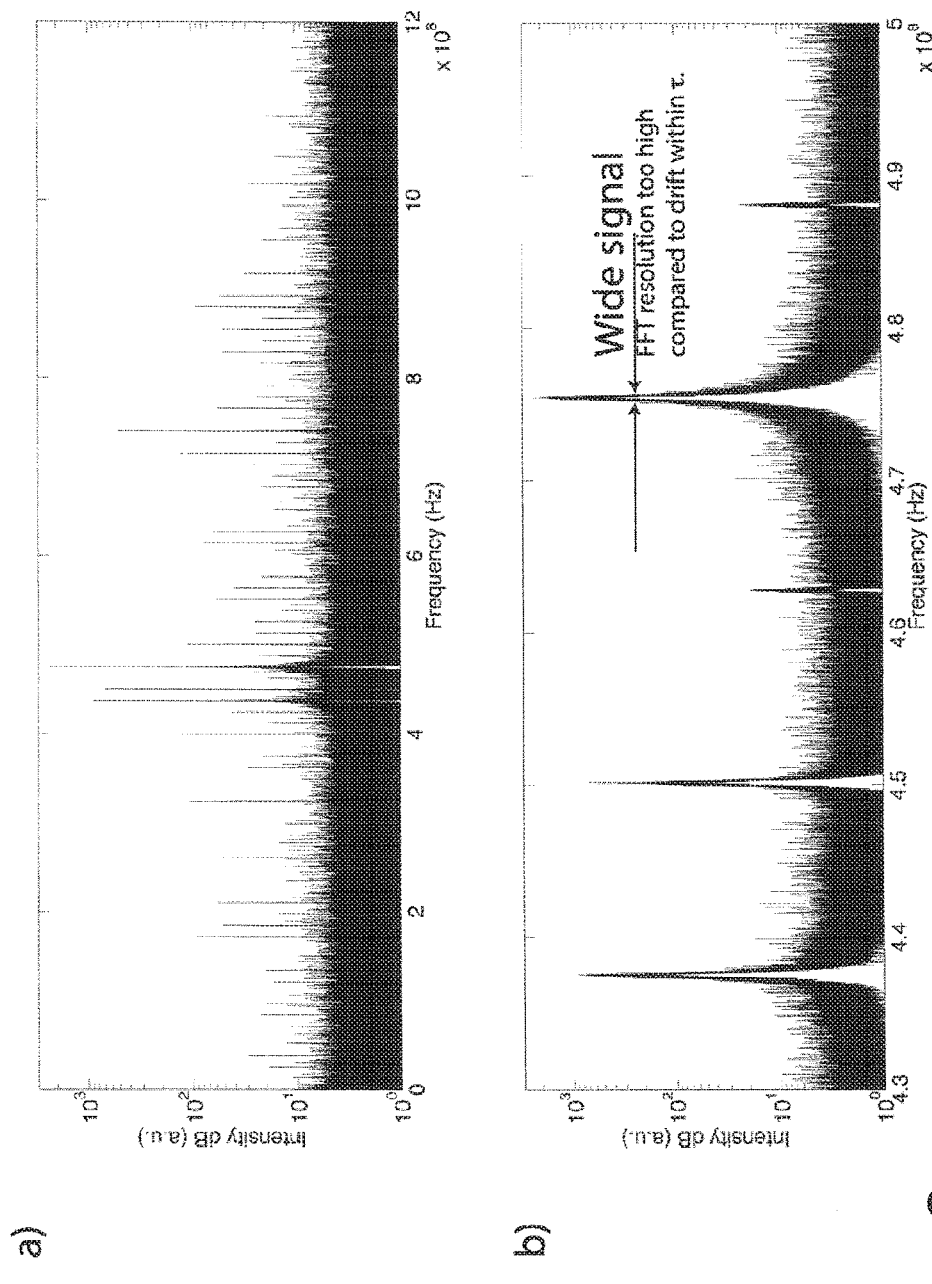

To convert the time-domain interferogram in the frequency-space, usually a discreet Fourier transform algorithm is performed, preferably the fast-Fourier transform (FFT). However, simply taking the FFT of the entire acquired signal will result in a frequency-analysis of the signal over the whole integration time T. The result is a spectrum with a very high frequency-resolution. At constant carrier frequencies of the multi-heterodyne signal, the FFT produces the averaged signal over the whole acquisition time T. The amplitude noise present on the multi-heterodyne signal will be averaged out over the time period T. In the case of a mufti-heterodyne spectrometer generated from small free-running multimode semiconductor lasers, the multi-heterodyne signal is however subject to a strong drift and/or dither. A 'smear out' of the signal in the frequency-domain is therefore the case. This is because the FFT algorithm is not well suited to analyze signals with changing frequencies. This effect is illustrated in FIG. 8a and FIG. 8b. It shows the multi-heterodyne signal of a signal acquired for T=10 ms. The multi-heterodyne signal linewidth of hundreds of kHz within the 10 ms is much larger than the resolution of the measurement (100 Hz). As a result the signal to noise ratio is becoming worse with longer integration time, which in turns strongly reduces the overall spectroscopic multi-heterodyne system performance. As it can be seen in the zoomed version in FIG. 8b, the signal extends not a single carrier-frequency anymore, since the multi-heterodyne signal drifts/dithers more than the resolution given by the inverse of the integration time FFT-resolution=1/T. This is a clear illustration of the limits to increase the signal-to-noise level in multi-heterodyne systems composed of small multimode lasers, which are subject to large dither/drift.

In a multi-heterodyne signal, there are N lines spaced by $\Delta f_{rep}$, as shown in FIG. 6b as it can be seen, there is no signal information between the multi-heterodyne lines. Apart from higher frequency resolution, it is no use to measure the signal at frequency resolution orders of magnitude higher than the frequency spacing $\Delta f_{rep}$ of the lines.

Figure 9:
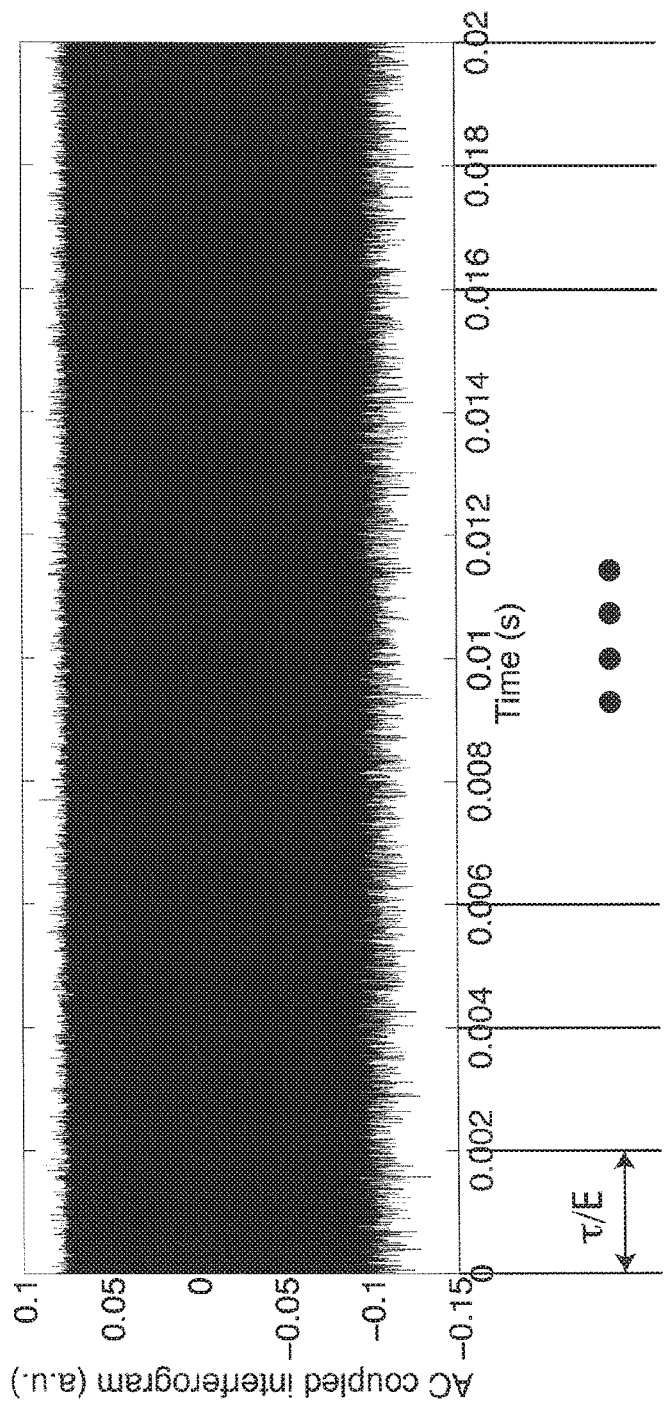
FIG. 9 shows the chopping of the input signal into E, preferably equally spaced, time slices.

In the hereby proposed method, we take the acquired signal of length $2^{\wedge}K$ and divide the time-domain signal into E, preferably equally spaced, individual timeslices. This is illustrated in FIG. 9. Each time slice is composed of $P=2^{\wedge}K/E$ points. The length of P is preferably of length $P=2^{\wedge}S$, with S being an integer number. If the individual time slice is not of length $2^{\wedge}S$, the time slice is preferably extended or shortened to the closest length fulfilling $2^{\wedge}S$. Each individual slice is then subsequently converted to the frequency-domain with a FFT algorithm. The length of E is chosen in a way, that the generated spectrum of each individual slice has a frequency-resolution$>=\Delta f_{rep}$. The length of P is preferably about 2 and 100 times the spacing of individual lines of the multi-heterodyne signal. This helps to optimize the minimum required acquisition time. It is also possible to use time slices comprising $P=5^{\wedge}K/E$ points, also providing a fast FFT.

The results are E individual spectra. Any dither/drift that is present within the time-scale of T and T/E will be visible in a drift in frequency in E multi-heterodyne measurements. To achieve a better signal-to-noise ratio with averaging, it is therefore preferable to take this drift in frequency into consideration. Essentially, it is important to average the signal by correcting for this drift. Several ways to solve the problem are presented therein after. It is possible to measure the amplitude of each peak in all E measurements and average these measured amplitudes. It is possible to measure the drift of a single or several peaks. With this knowledge, it is possible to "shift" all spectra in accordance with others. A simple average along the E-spectral measurements will produce the averaged spectra, since the multi-heterodyne measurement is equally spaced in all measurements. This "shift" of spectra can be achieved in different ways depending on the hardware implementation. A simple shift in a pointer will result in good performance when coding in a language close to the hardware implementation (examples: C, C++, FPGA, GPU). Another approach uses the method to average smaller subsets of spectra prior to correcting for the drift. Each subset is composed of L<=P spectra. This is especially useful if the drift/dither is of little impact in the time frame L, whereas it is of strong impact in the time frame of P. The correction of the drift is then applied to those priority averaged signals. This proposed correction of the drift is preferably also applied to successive acquired and averaged signals of length $2^{\wedge}K$.

FIG. 10 shows the effect of "shifting" the spectra. Here E=9,000 spectra were created out of one measurement. In FIG. 10a the signal is not corrected for dither/drift. In FIG. 10b the signal is corrected for dither/drift. The signal can easily be averaged along the 9,000 spectra. Another possible solution to solve this problem is by decreasing the length of P until the signal drift/dither over the acquisition time is smaller than the resolution of the E individual spectra. This allows averaging without prior shifting the spectra, at an expanse of an increased risk of electrical signal crosstalk due to signal leakages between the individual heterodyne signals. The side-lobe level of a heterodyne signal starts interfering with the main lobe signal of the next heterodyne signal, resulting in crosstalk of the electrical signal which in turn results in decreased measurement precision of the multi-heterodyne system.

This correction in drift is preferably also applied if the drift is voluntarily introduced in the system. An example is the case, in which the sample comb is tuned during the acquisition in order to cover a larger optical spectral coverage during the acquisition compared to the intrinsic line width of the laser source.

The procedure of divide the time-domain signal into E, preferably equally spaced, individual time-slices, however introduces a noise source due to the incoherent sampling procedure applied when acquiring the signal. This is especially relevant for the proposed methods and devices here, since coherent sampling is not an applicable technical solution in multi-mode laser outputs with a constant output power. Therefore this technical problem is inevitable and needs to the solved.

The source for this is a known problem in signal-analysis and is called signal-leakage. A way to circumvent this is by applying a windowing function. In the method described herein, we therefore apply a window function on all E-equally spaced lines. There are many different possible windowing functions that can be applied. In absorption spectroscopy measurement good amplitude accuracy is demanded, therefore the window is preferably a flat top window. In measurement relying on measuring the frequency, good frequency accuracy is demanded; the window is therefore preferably a boxcar (meaning none). Other windowing functions are well known by someone skilled in the art.

Figure 11A:
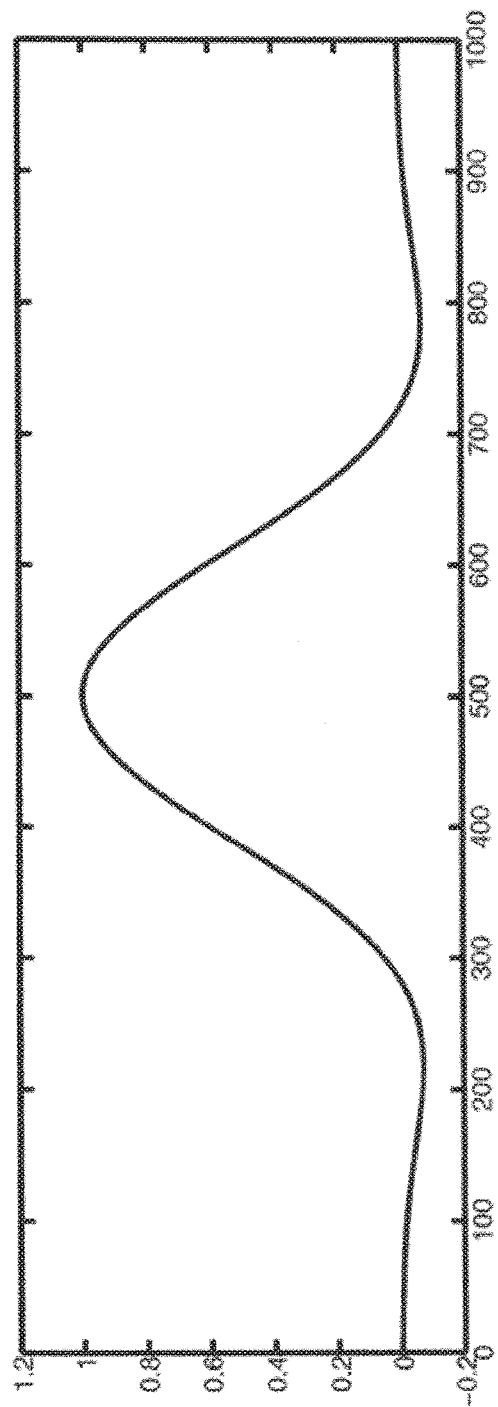
FIG. 11 shows different windowing techniques: a) Flattop window over 1000 points; h) the individual time-slices are multiplied by the flat-top window prior to computing the FFT and c) Overlap processing.
Figure 11B:
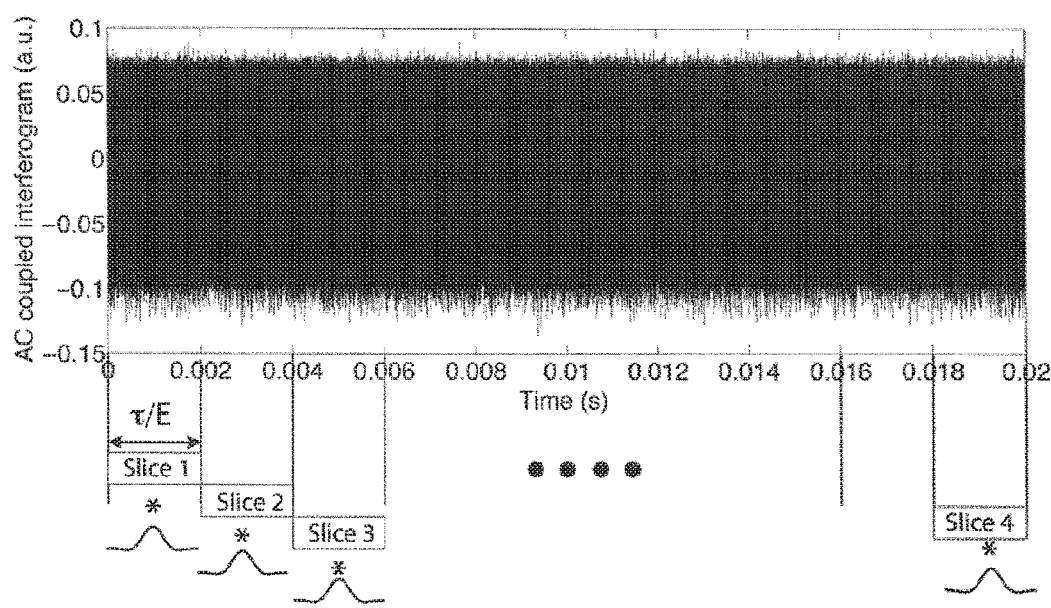
Figure 11C:
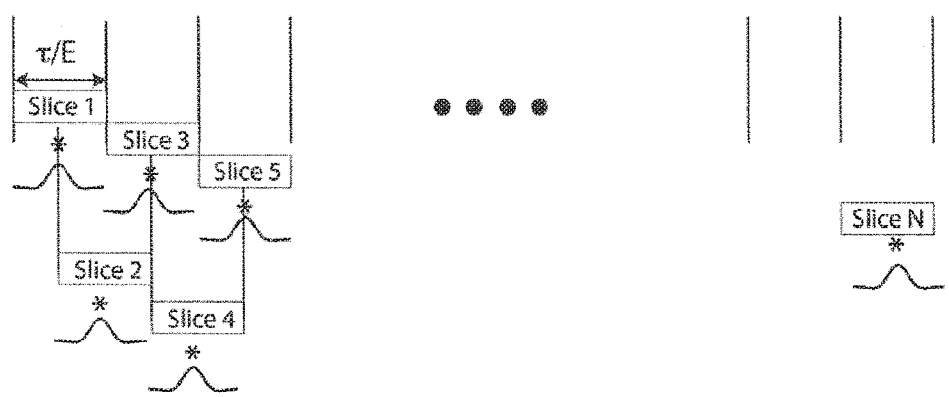

FIG. 11a shows an exemplary flat-top window of 1000 point width. FIG. 11b illustrates how the individual time-slices are multiplied with a flat-top window prior to computing the FFT. One main drawback of windowing functions is the possible energy loss due to attenuation of the signal. Information which was acquired where the windows has a small absolute value is diminished. As a consequence of this, the signal needs to be integrated longer to reach the same information. A workaround proposed in the method according to this specification is to use overlap processing. This is illustrated in FIG. 11c. The generated time-slices overlap in the time-domain. This generates a larger number of time-slices and information is regained. For example, slice 2 is overlapping with slice 3 and 1. However, after windowing with a flat-top function, the information found in slice 2 is almost completely filtered out in slice 1 and 3.

Figure 12A:
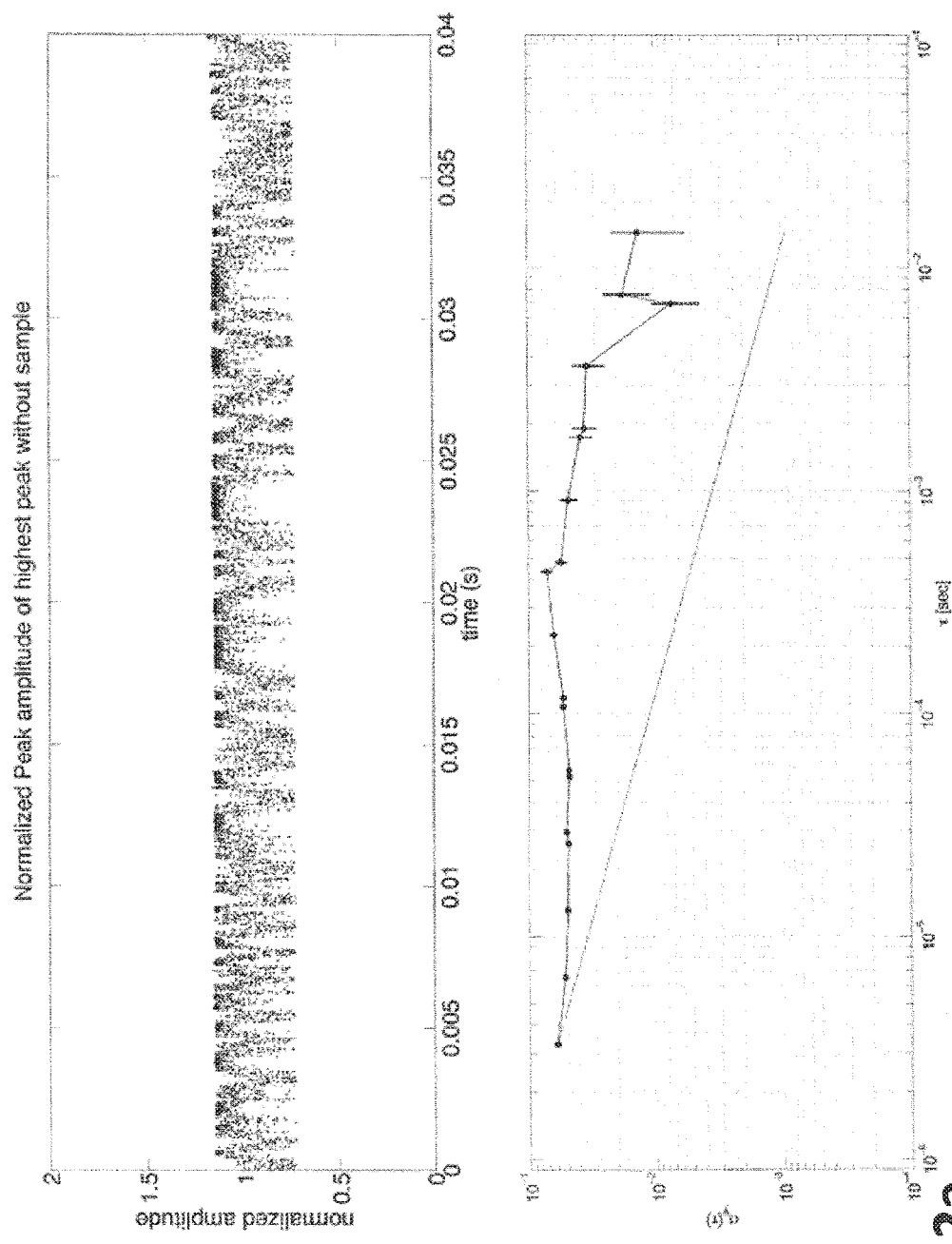
FIG. 12 shows the effect of windowing on signal-to-noise ratio with FIG. 12a showing a normalized time trace of a single peak of a multi-heterodyne measurement, whereas the top part of FIG. 12b shows a normalized time trace of the same peak of the multi-heterodyne measurement with windowing applied on each time-slice.
Figure 12B:
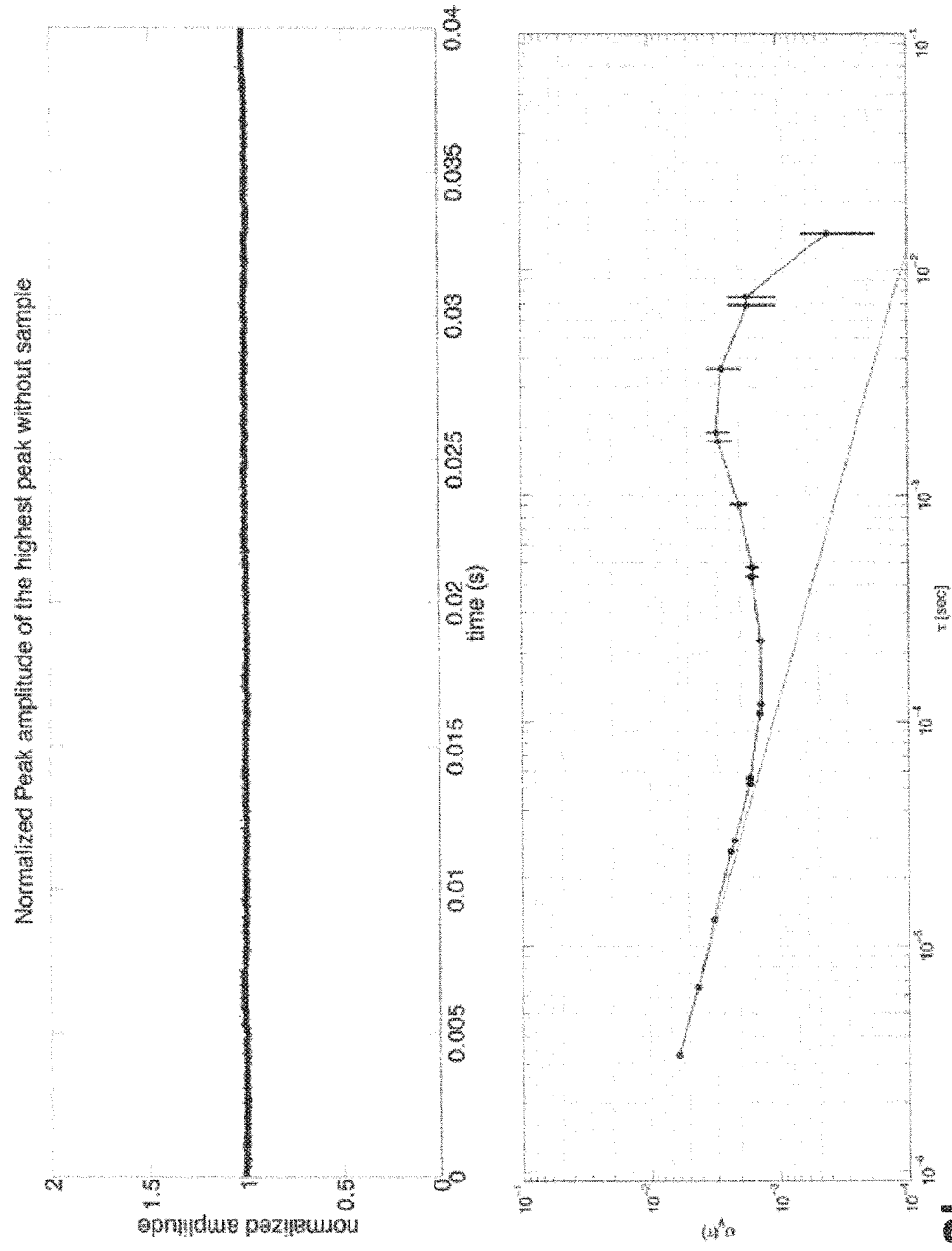

FIG. 12 shows the Allan deviation plots of the averaged signal with a) no windowing applied and b) with a flat-top window applied to all slices. An increased precision of over one order of magnitude is achieved due to the applied windowing as described beforehand. The top part of FIG. 12 shows a normalized time trace of a single peak of a multi-heterodyne measurement. Due to the incoherent sampling and therefore random cuts in the signal, signal-leakage has drastic effects on measured amplitude noise. In comparison to this, the top part of FIG. 12b shows a normalized time trace of the same peak of the multi-heterodyne measurement with windowing applied on each time-slice. The bottom part of FIG. 12a and FIG. 12b show the Allan-variance plot which illustrates the enormous differences in reachable signal-to-noise ratios. Measurement shown FIG. 12a reaches a signal-to-noise ratio of only $10^{-2}$ after 10 ms integration time, whereas measurement as shown in FIG. 12b reaches a signal-to-noise ratio of $10^{-3}$.

Instead of using a spectrum analyzer based or analog-to-digital converter and subsequent digital Fourier transform algorithms of the entire multi-heterodyne spectrum, the signal can also be monitored with a sweep spectrum analyzer (for example R&S FSU spectrum analyzers) or real time spectrum analyzers (for example the Tektronix RSA6000). The methods described beforehand will also work with such kind of analyzers. The main drawback of using such a sweep spectrum analyzer is the loss of parallel measurement of the multi-heterodyne measurement over the whole spectral bandwidth. Drifts and jitter that happen at time-scales lower than the sweep speed and with frequency excursions larger than the chosen resolution bandwidth of the instrument results in an unequal spacing of the multi-heterodyne signal. Shifting the acquired sequential signals and subsequent averaging the signal will be less effective due to the non-uniform multi-heterodyne signal spacing.

As described beforehand, small semiconductor based multimode sources open new ways of implementing a compact and small multi-heterodyne spectrometer. Another technical difficulty, which arises due to the small size of the semiconductor light source and which can be solved by the easy tunability of said laser, is the sampling resolution of these measurements. Due to the small size of semiconductor based multimode lasers, in the order of several millimeters or less, these sources have a characteristic mode spacing of several GHz in frequency (>1 GHz) (More than 1 MHz, typically 3-30 GHz, less than 1 THz). In a typical multi-heterodyne spectrometer setup, this mode spacing determines the spectral sampling of the investigated sample and therefore ultimately limits the spectral resolution of the setup. This limits severely the performance of the system. This spectral resolution given by the mode spacing may result in a strong spectral under sampling of the acquired data. Furthermore, it leads to an unwanted uncertainty in the measurement. Since the linewidth of a single laser mode is often very narrow (in the present case 100 kHz), it is possible to miss some narrow band features of the sample in question. For example, light molecules are missed or it is impossible to resolve several isotopomers of a molecule.

Figure 13:
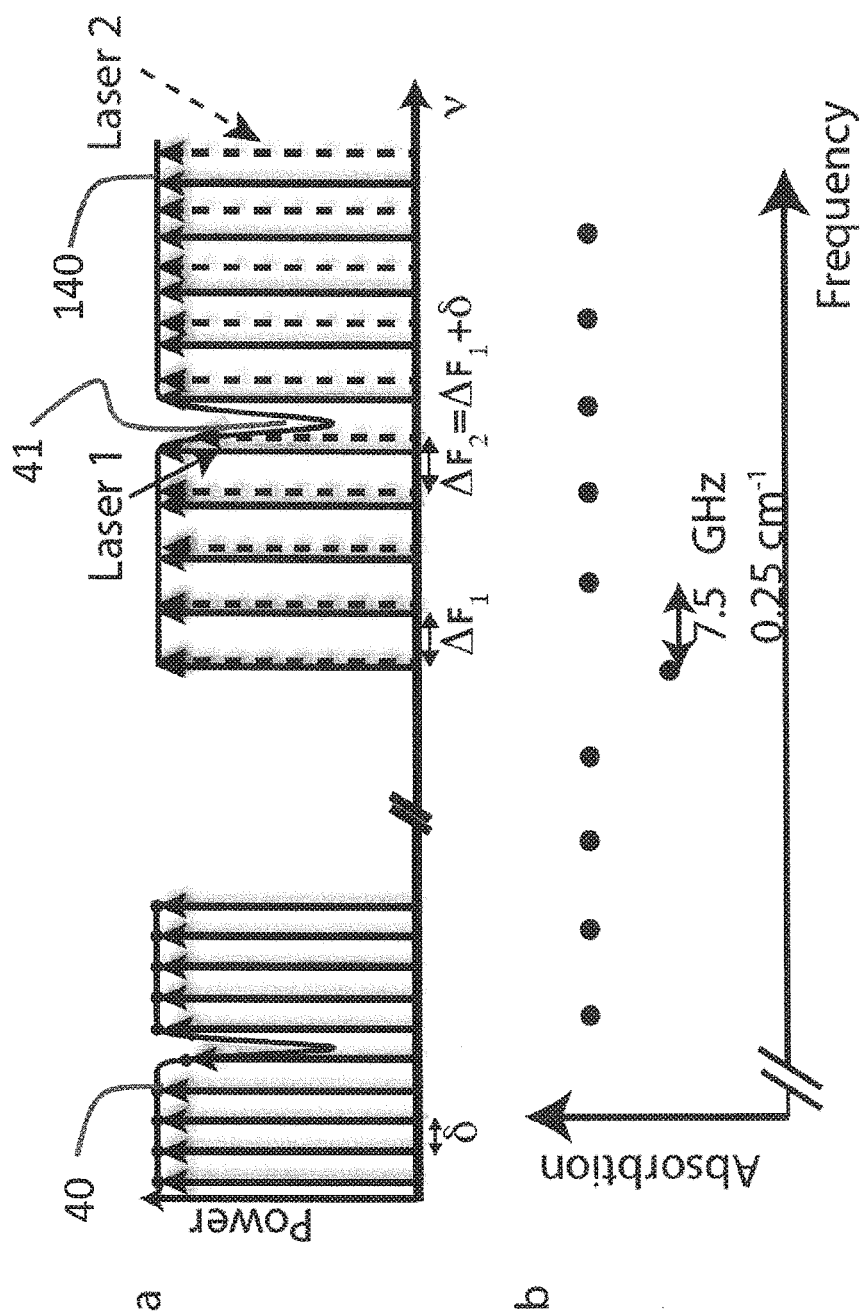
FIG. 13 shows typical multi-heterodyne acquisition of a sample with a narrow absorption feature compared to the mode spacing wherein in FIG. 13a the optical absorption line is smaller or in the order of magnitude of the mode spacing so that the sampled spectrum from the RF domain shown in FIG. 13b might miss some important features and the measured absorption is not the correct one in intensity.

The acquired signal is a spectrally sampled signal of the absorption spectrum in the optical domain. This spectral sampling corresponds to the mode-spacing of the sample comb. This is a major problem in a number of cases. For example, any measurement that deals with very narrow absorption features close to or smaller than the mode-spacing will be problematic. This case is illustrated in FIG. 13a and FIG. 13b for the prior art approach. The optical absorption line 40 is smaller or in the order of the mode spacing. Therefore the sampled spectrum from the RF domain shown in FIG. 13b accessible by the heterodyne acquisition might miss some important features as the dip 41 in the absorption line. Another artifact is wrong measurements in concentration, since the measured absorption is not measured at the peak absorption of the molecule. In general, the sampled signal should not be under sampled; otherwise the chosen fitting routine does not work properly. In prior art multi-heterodyne setups, this is not a major problem. These setups usually work with large cavity comb-sources. Therefore their mode-spacing is in the order of kHz-MHz. Small semiconductor based comb sources however have usual mode-spacings of several GHz, leading to a strong under sampling in multi-heterodyne measurement devices based on said sources.

The method according to an embodiment of the present invention allows overcoming this problem of the spectral under sampling in a multi-heterodyne measurement device by exploiting the fast and easy tunability of semiconductor laser devices 11 and 12. It enables high-resolution spectroscopy with a multi-heterodyne setup realized with multi-mode-laser sources featuring large mode spacing. The method is independent of additional optical reference sources. In this invention, both multimode lasers 11 and 12 act as a source for an optical reference measurement. This leads to a simplification of the optical setup at the expense of slightly decreased resolution compared to high-resolution prior art comb spectrometers. The resolution of detection devices based on the hereby-disclosed methods is limited by the overall temperature and drift stability of the free-running setup. In laboratory setups, this is presently limits the resolution of 100 kHz to tens of MHz. This is largely good enough for the majority of sensing applications. The invention is based on the insight of the tunability of semiconductor lasers when driven in multimode operation combined with the novel acquisition method disclosed beforehand to eliminate the problem of the large sample spacing in miniature multimode sources with large mode spacing (1 GHz-1 THz). The novel acquisition technique furthermore includes measuring the performed tuning of the sample and/or local oscillator laser in the RF-frequency domain. This method makes the multi-heterodyne apparatus extremely versatile and allows the reconstruction of an absorption spectrum. It is however not restricted to semiconductor lasers, and also includes other small (with high rep-rate, see before) and easily tunable multimode sources, such as the microresonator combs.

Figure 14:
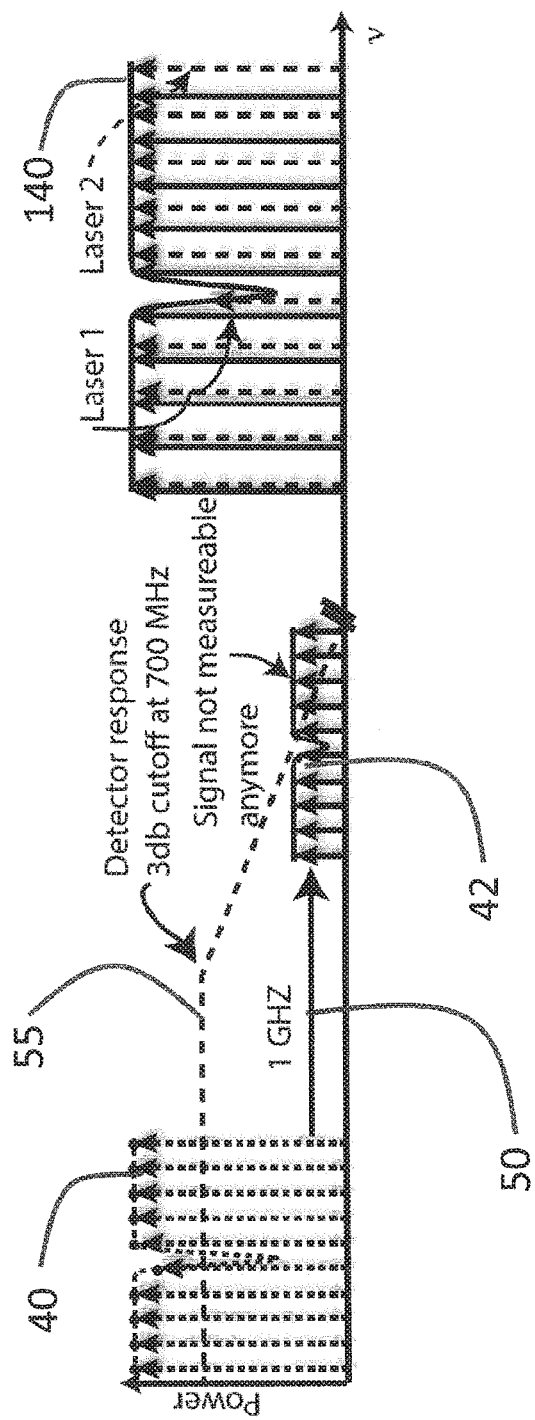
FIG. 14 shows tuning of the second laser according to FIG. 3 to cover the full absorption feature of a molecule without applying the principles according to an embodiment of the invention failing to acquire the signal.

To resolve the full spectrum at high-resolution, the sampling laser (being the second laser 12) has to be tuned by at least 1 free-spectral range corresponding to the mode spacing, typically 3-30 GHz. Since the heterodyne signal is also tuned by the same amount as the sampling comb when tuning the emission frequency, the heterodyne signal is moved out of the available bandwidth of the detector (in the present case 1 GHz). This is illustrated in FIG. 14, where tuning 50 of the sample laser of 1 GHz already pushes the signal out of the detector bandwidth 55 (750 MHz). Since the tuned signal 42 is out of the available bandwidth of the detector 20 (1 GHz), it becomes impossible to take a measurement. Furthermore, even if fast detectors with bandwidths of >1 mode-spacing are available to circumvent this problem, those high signal bandwidths pose a hard challenge to the acquisition electronics, making the whole system very expensive.

The following method is therefore to limit the tuning of the signal laser, second laser 12, to values so that the heterodyne signal stays in the available bandwidth of the detector 20 and the acquisition electronics prior to counteracting with the local oscillator laser 11 to bring back the signal to lower frequencies, ideally to the same position in the frequency domain as before tuning the sample laser 12. This novel way to acquire high-resolution spectrum is not limited by the detector bandwidth and not limited by the available detector bandwidth nor by the acquisition electronics bandwidth. In order to result in a useful tuning result, at least part of the multi-heterodyne signal needs to be in the available bandwidth of the detector.

Figure 15:
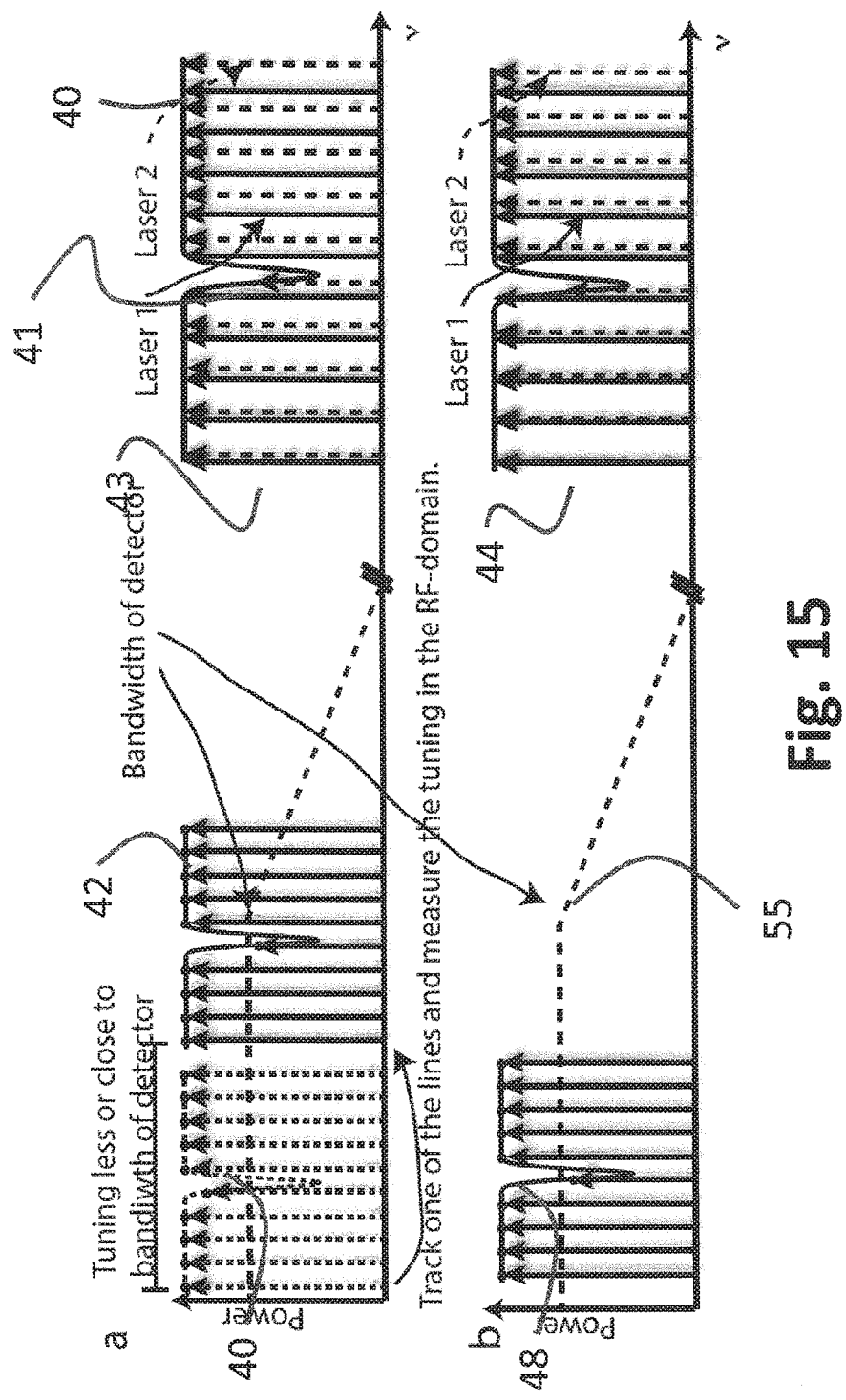
FIG. 15 shows tuning of the first and second laser according to FIG. 3 to cover the full absorption feature of a molecule according to an embodiment of the invention.

FIG. 15*a* illustrates this procedure. The sample laser (here second laser 12) is tuned only by a small amount and is kept within the available bandwidth of the detector. The absorption line in the RF-domain is therefore tuned to another frequency in the RF-domain, represented by absorption line 42. This tuning of the second laser 12 is shown on the right hand side of FIG. 15*a*. Through a dotted line for the second laser 12 compared to the non-tuned laser case illustrated in FIG. 13*a*. To know the exact tuning of the sample comb, the signal is tracked in the RF-domain. To bring back the signal to the original place in the RF-domain and within the bandwidth of the detector, the local oscillator laser (here first laser 11) is also tuned by roughly the same amount as was previously tuned second laser 12, as illustrated in FIG. 15*b*. The first line is not re-tuned; the second laser is tuned. Both lasers 11 and 12 are tuned by the same amount in the optical domain, whereas the heterodyne signal is back close to its original position.

Figure 16:
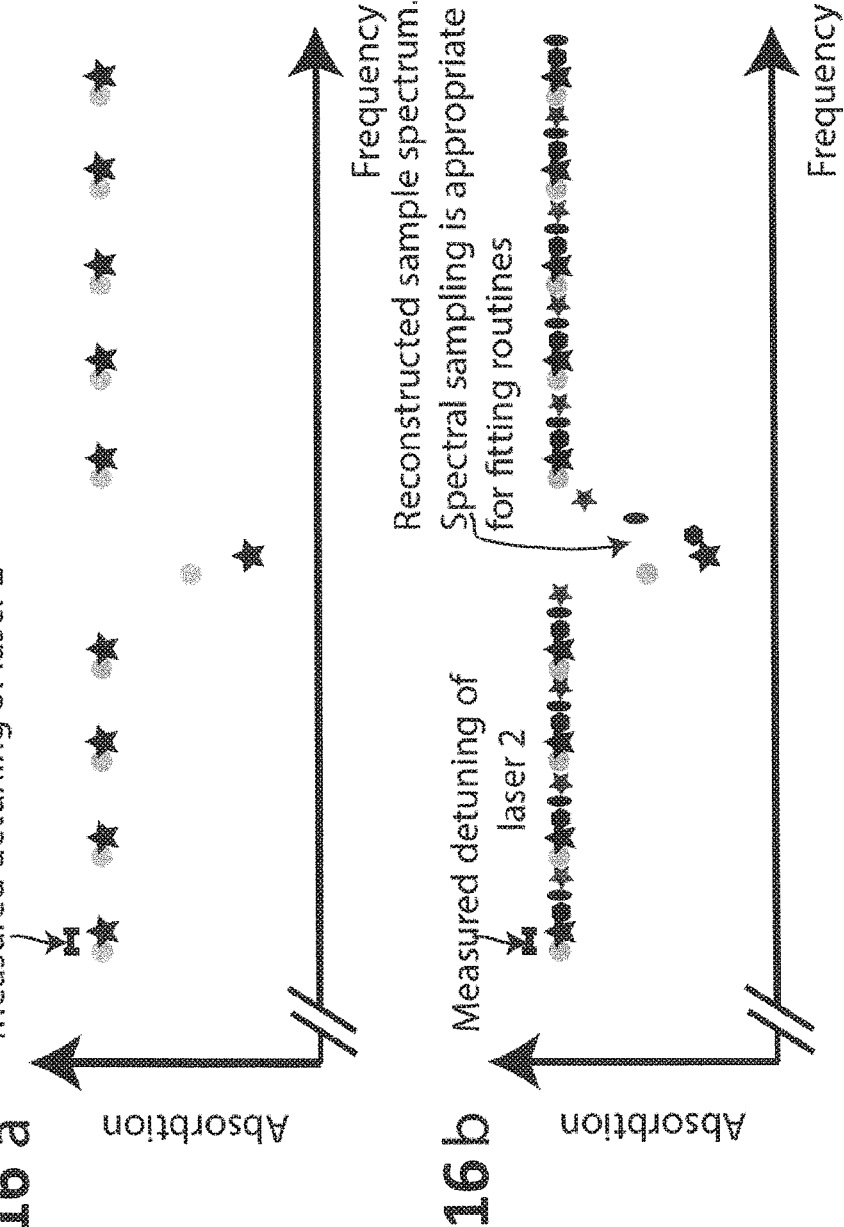
FIG. 16 shows the result after having sequentially enhanced the resolution of the measurement by filling up the mode-spacing, wherein the two measurements of FIG. 16a are generalized to N measurements in FIG. 16b.

At this moment, a new measurement can be carried out. FIG. 16*a* shows how to interpret this new parallel measurement (measurement 2 in FIG. 16*a* related to the star shaped points) in the optical domain Where the measured sample has the characteristic absorption.

The second measurement 2 gives a spectrally sampled spectrum (the spectral sampling of the acquired spectrum is still the mode-spacing of the laser) that is shifted in the optical frequency domain by exactly the measured detuning of second laser 12 measured prior to tuning the local oscillator (first laser 11) as describe beforehand and illustrated in FIG. 15*a*. Tuning the multimode sources by a value of mode spacing/N and repeating this measurement N times, the resolution is enhanced by a factor of N. This is illustrated in FIG. 16*b*), where various shapes of points show the different N measurements. The resolution can be enhanced up to $f_{rep}/N \approx FWHM_{Laser}$ mode. Ideally, it is increased up to a point that the chosen fitting routine for detection of the sample is working appropriately.

Figure 17:
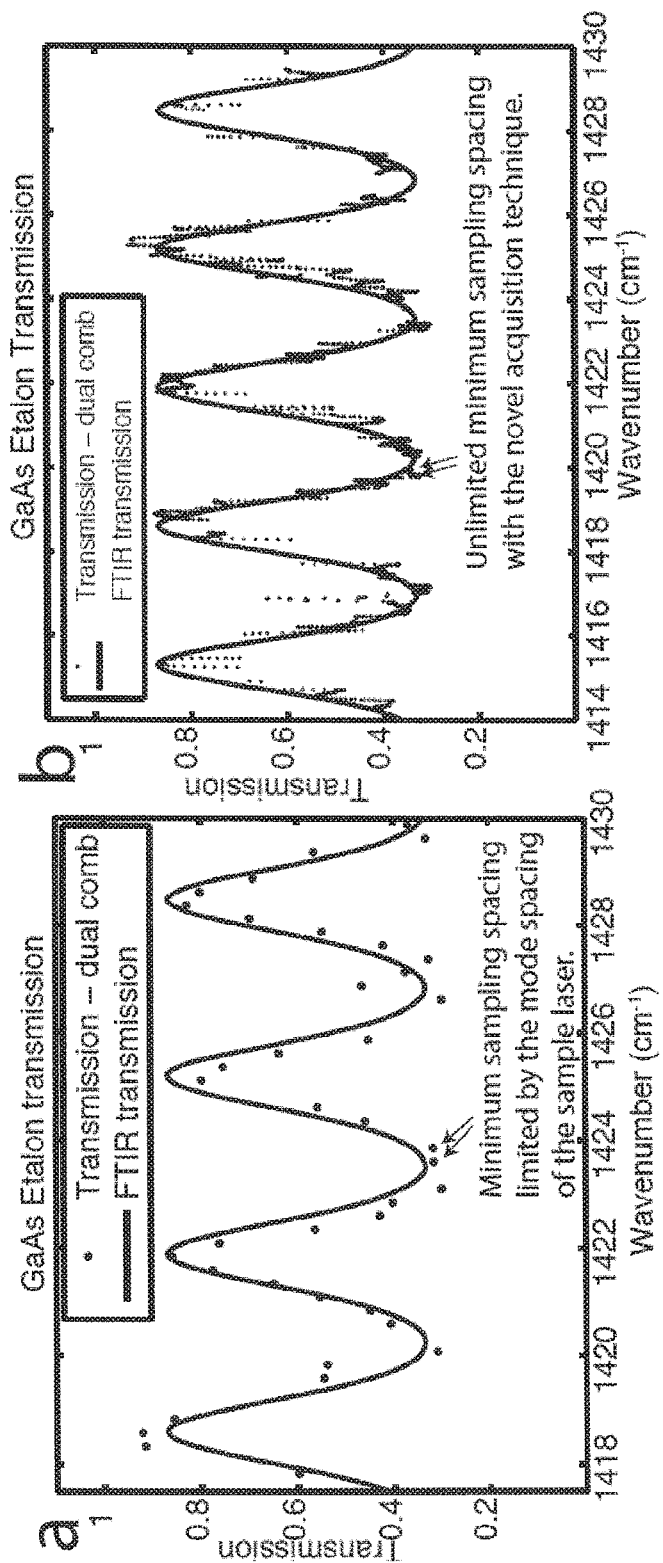
FIG. 17 shows multi-heterodyne and Fourier-transform infrared spectrometer measurement of the transmission of a double-side polished GaAs etalon.

FIG. 17*a* shows the capability of this novel method to acquire high-resolution spectra. To illustrate this, the multi-heterodyne measurements are compared to Fourier-transform infrared spectrometer measurement. As proof of principle measurements, the transmission of a double-side polished GaAs etalon is measured. FIG. 17*a* shows the measurement of a single parallel acquisition with a multi-heterodyne setup. The minimum sampling spacing is given by the mode-spacing of the sample laser, here 7.5 GHz (0.25 cm−1). FIG. 17*b* shows the new acquisition method allowing a high-resolution measurement of the GaAs transmission spectrum. The resolution was enhanced by a factor of roughly 100 to 80 MHz (0.0026 cm−1).

Figure 18:
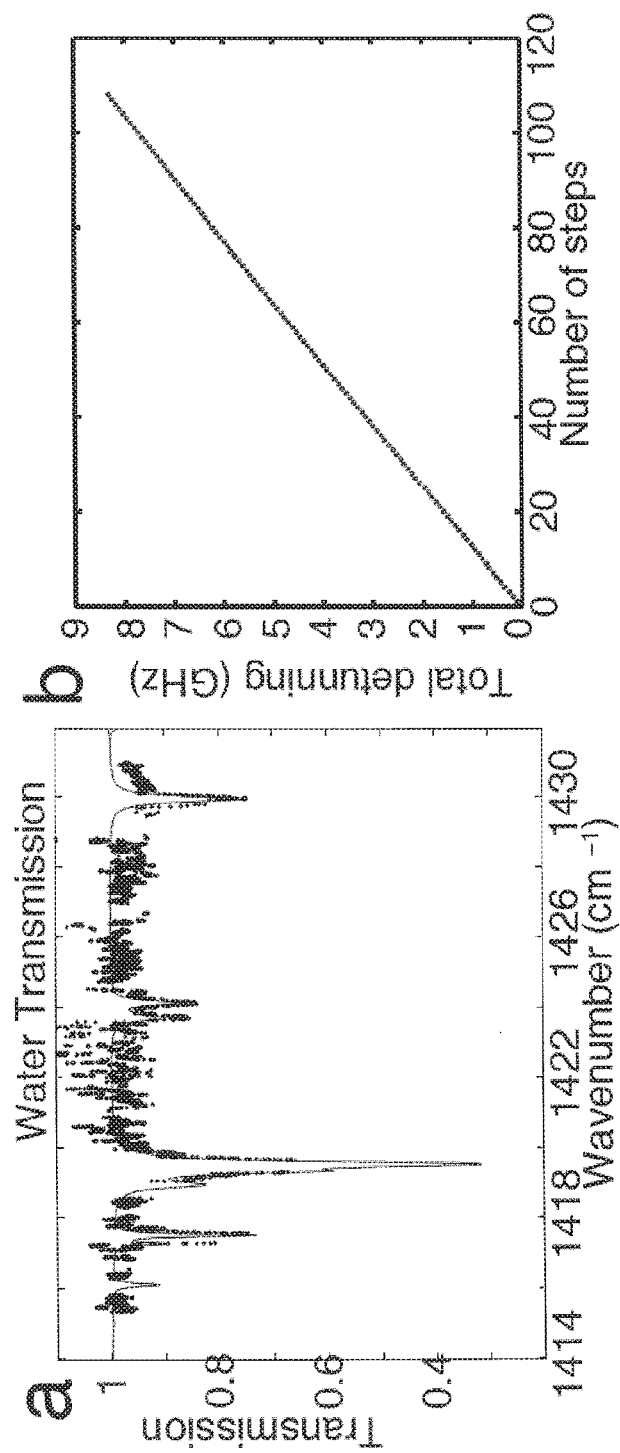
FIG. 18 shows a high resolution spectrum of water with the method and apparatus according to the invention to increase the resolution by a factor of roughly 100 from 7.5 GHz to 80 MHz and an example for tuning.

FIG. 18*a* shows another example in which the novel method and apparatus was used to measure a high-resolution spectrum of water absorption. The resolution was enhanced by a factor of roughly 100, from 7.5 GHz to 80 MHz.

FIG. 18*b* shows the measured detuning of the sample laser 12 of the method described beforehand. This allows the reconstruction of the optical spectrum over about 100 steps with an overall detuning of about 8 GHz.

One limiting factor for the tuning of the laser is the bandwidth of the detector 20 used in the setup. However due to the very sensitive detection of heterodyne detection, the heterodyne signal can be detected also if the tuning is bigger than the bandwidth of the detector 20 (roughly 2× bandwidth). We therefore make a clear distinction between detector bandwidth, where the detector 20 has the 3 dB cutoff, and the available bandwidth, the bandwidth h heterodyne signal drops below the noise floor.

This invention is not limited to sequential tuning and also includes embodiments comprising the simultaneous tuning of the local oscillator and sample laser by the same amount to keep the heterodyne signal at a constant frequency. The invention also covers the possibility to first tune the local oscillator laser 11 and then subsequently the sample laser 12, i.e. inverse the tuning sequence as described above.

Furthermore, it also includes the possibility to acquire the signal while tuning one laser and while keeping the other laser constant.

All the methods described beforehand on the acquisition and averaging methods are preferably applied to the method described here.

The tuning of the laser 11 or 12 can be achieved by tuning the temperature of the device. Examples include tuning the temperature with the help of a Peltier, with the help of a second light source for heating, for example a laser or a LED, or any other temperature tuning of the device. Other methods for tuning according to further embodiments of the invention include the tuning by changing the current in the device. Essentially, any process that changes the effective optical path length $l_{opt}=n*l$, which either changes the refractive index of the device n or the length l of the device, is suitable.

Figure 19:
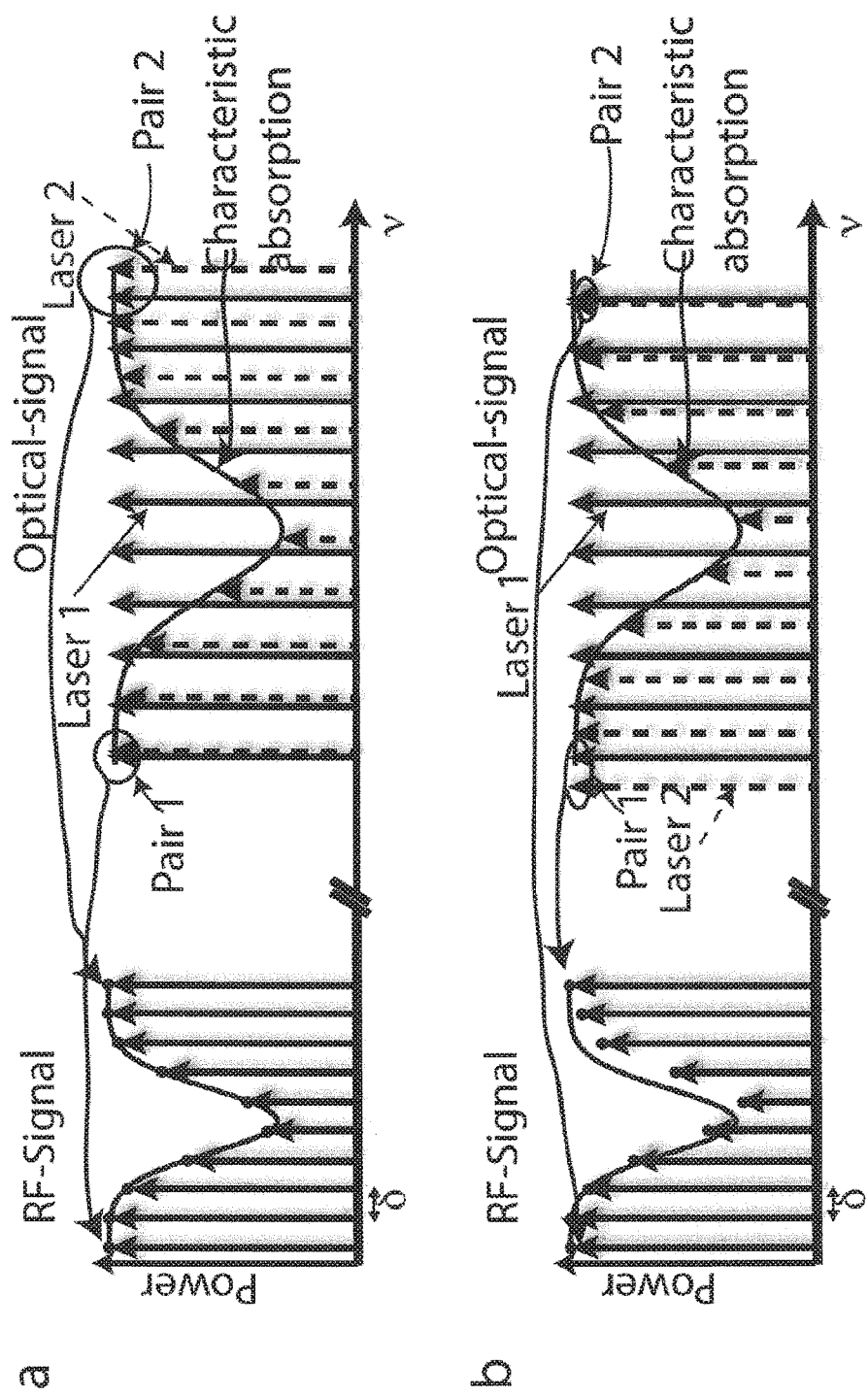

There is however still an ambiguity in the detected measurement, which needs to be solved. The detected RF-signal can be mirrored in the RF-domain compared with the optical domain. The problematic is illustrated in FIG. 19. FIG. 19*a* shows the case without the problem of mirroring. Low frequencies in the optical domain are mapped to low frequencies in the RF-domain. High frequencies in the optical domain are mapped to high frequencies in the RF-domain. FIG. 19*b* illustrates the case with the problem of mirroring. Low frequencies in the optical domain are mapped to high frequencies in the RE domain. High frequencies in the optical domain are mapped to low frequencies in the RE domain resulting in a mirrored sampled spectrum, which does not correspond to the direct mapping of the acquired sample. This ambiguity is caused by the fact that it is not clear how the two multimode lasers are exactly placed in the optical frequency domain when taking a multi-heterodyne measurement. Furthermore, the relative mode-spacing of the two lasers leads to similar effects. If the signal is not-mirrored for a certain mode spacing given by $\Delta f2 = \Delta f1 + \Delta f_{rep}$, the signal will be mirrored for a different mode-spacing of $\Delta f2 = \Delta f1 - \Delta f_{rep}$. One prior art solution to address the problem is based on the knowledge of $f_{ceo}$ as well as $\Delta f1$ and $\Delta f_{rep}$. Another method is by comparing the measured spectrum with a known spectrum and mirroring the result if needed. Depending on the situation, these two solutions are however not well suited. Measuring the $f_{ceo}$ can be very complicated or even impossible and add enormous complications on the optical setup. Measuring a known spectrum can also be a problem if the spectrum to be measured is unknown or if the measured signal is too noisy.

Figure 20:
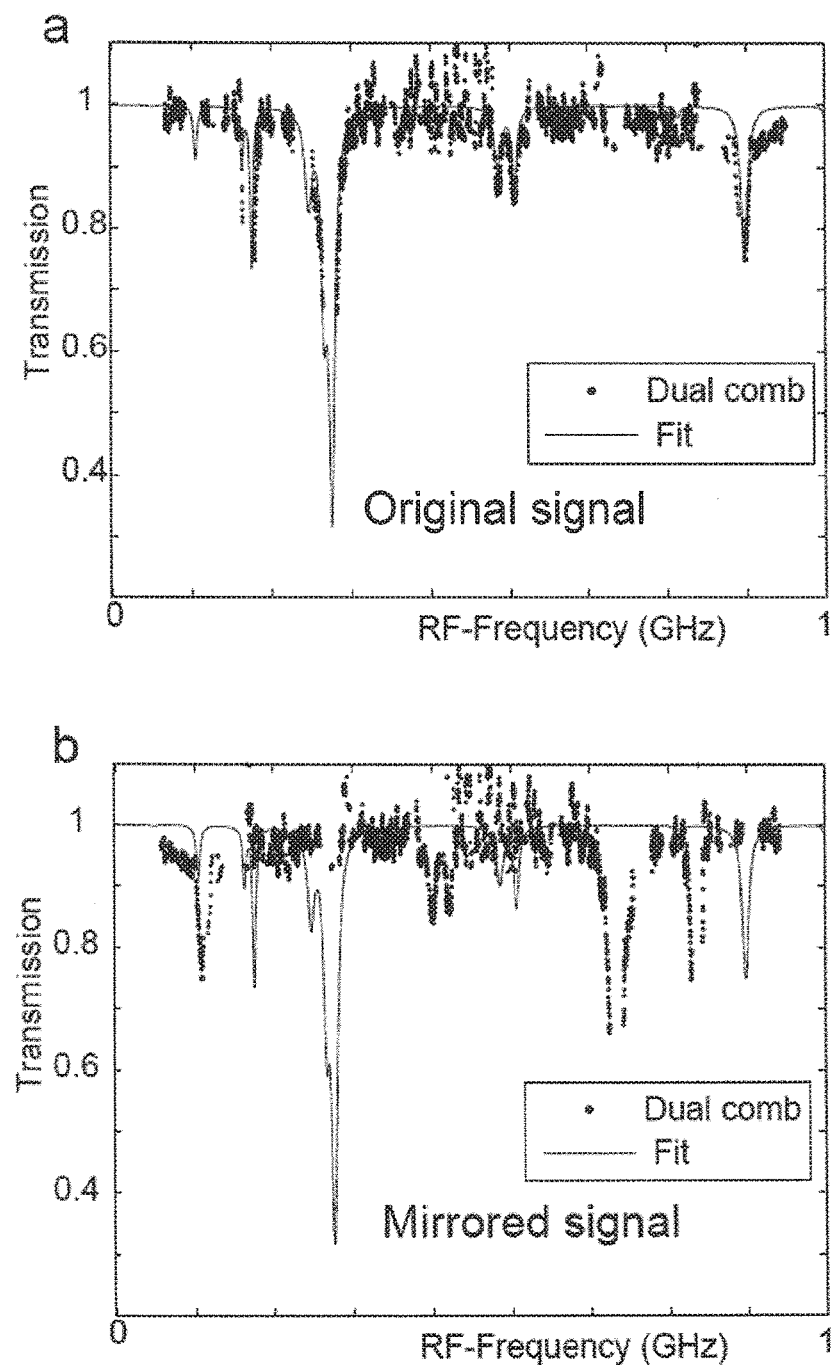
FIG. 20 shows the problem of a mirrored acquired spectrum showing in FIG. 20a a correctly acquired spectrum and in FIG. 20b a mirrored spectrum.

A measured spectrum and an example of a mirrored spectrum is shown in FIG. 20. The correct acquisition is shown in FIG. 20a, whereas the resulting acquisition of a mirrored configuration is shown in FIG. 20b. The fit does not work in the mirrored configuration.

Another method disclosed in this invention to realize high-resolution and high-sensitivity multi-heterodyne measurement and devices is describe here. It allows to resolve this mirroring ambiguity by no a priori knowledge of the $f_{ceo}$ of both multimode sources. The insight of the easy tunability in combination with the insight of the multi-heterodyne measurement technique introduced before-hand allows to unambiguously resolve the mirroring of the spectrum even if $f_{ceo}$ is not known. The method applied is as follows. First, it is necessary to measure the mode spacing of both multimode sources, $\Delta f_1$ and $\Delta f_2$. Several methods exist to do that, for example measurement of the optical beating on a very fast detector, or preferably, by measuring the beating of the electronic population as described in EP 13 005 072.7. By changing the effective optical path length $l_{opt}$ of one of the multimode-lasers in a known direction, the mode-spacing will also change in a known direction. Increasing the optical length decreases the mode spacing by $-\Delta f_{length}$, whereas the decrease in optical length increases the mode-spacing by $+\Delta f_{length}$. Decreasing the optical cavity length leads to a blue-shift of all modes, whereas an increase of the optical cavity length leads to a red-shift of all.

Common methods exist to easily change the optical path length $l_{opt}$ in a known direction. Examples include tuning the temperature with the help of a Peltier, with the help of a second light source for heating, for example a laser or a LED, or any other temperature tuning of the device. Other possible methods include the tuning by changing the current in the device. Essentially, any process that changes the effective optical path length $l_{opt}=n*l$, which either changes the refractive index of the device n or the length l of the device, is suitable.

By measuring the shift in the multi-heterodyne measurement while changing the optical length of one laser and by knowing the relative mode-spacing compared with the stationary multimode out-put, the mirroring configuration can therefore be measured.

Figure 21:
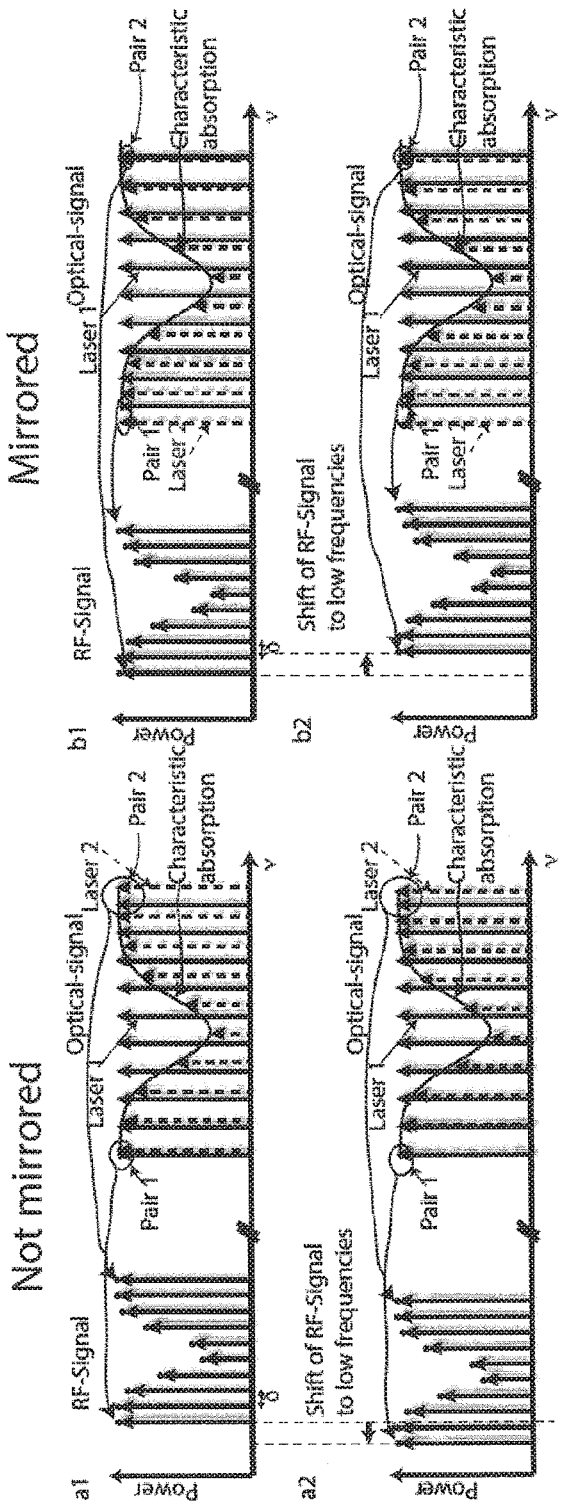
FIG. 21 shows an approach for unambiguous resolving of the spectrum by changing the effective optical path length tuning a single multimode source in a multi-heterodyne setup.

An example to clarify the method is illustrated in FIG. 21a and FIG. 21b. In this configuration, the sampling multimode laser output (second laser 12) has the larger mode spacing than the local oscillator laser output (first laser 11). In a not mirrored configuration, changing the effective optical path length of laser 12 to larger values, therefore decreasing the mode spacing by $-\Delta f_{length}$ leads to a red shift of all modes of second laser 12. This leads to a shift in lower frequencies in the multi-heterodyne signal (FIG. 21a1/a2). Whereas, if the same experiment is carried out while in a mirrored configuration, red-shifting the modes of the sample laser (second laser 12) compared with the local oscillator laser (first laser 11) will result in a shift of the multi heterodyne signal to higher frequencies, as shown in FIG. 21b1/b2.

The method and apparatus allows changing any mode spacing, either of first laser 11 or second laser 12. It is also not relevant which laser 11 or 12 has the larger mode spacing.

Figure 22:
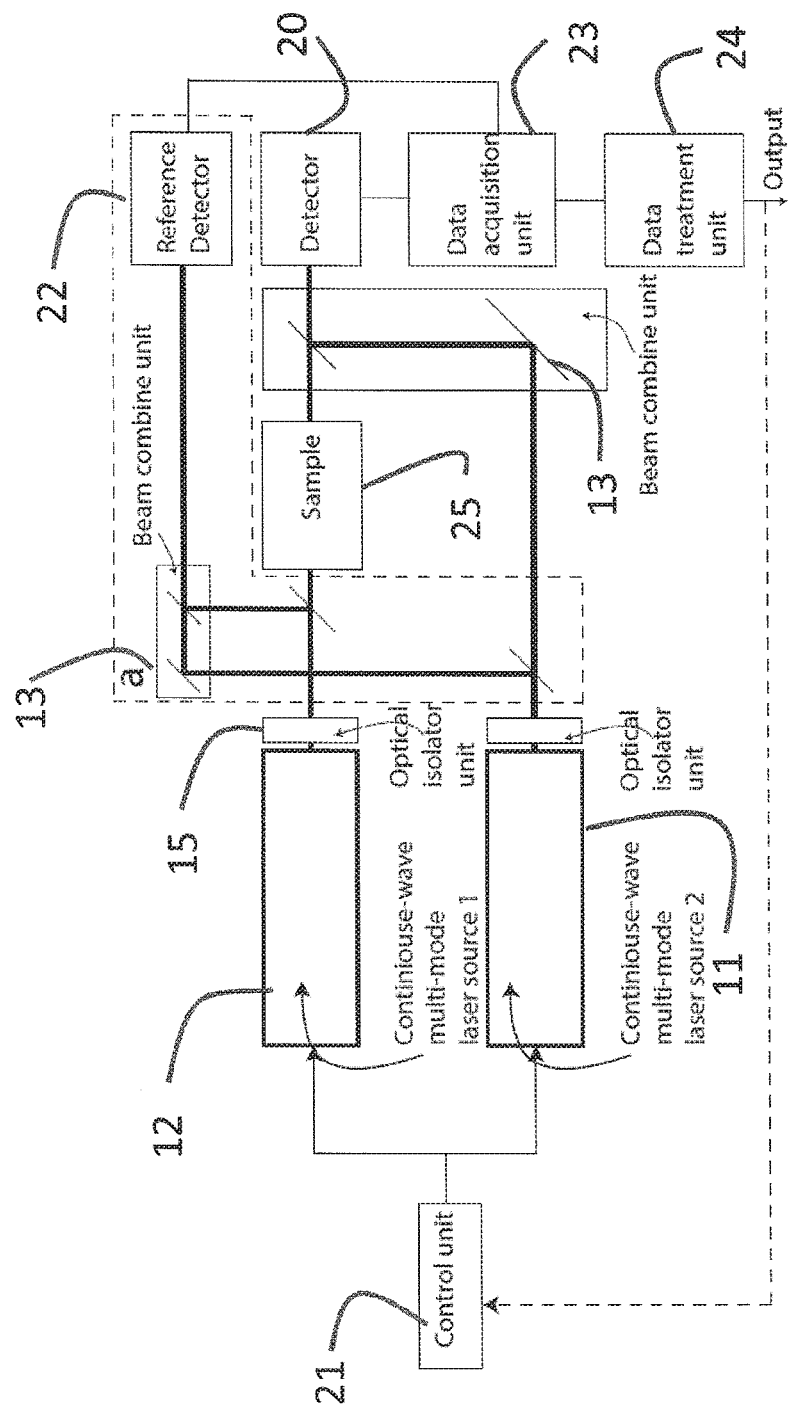
FIG. 22 shows preferred implementation of a device according to an embodiment of the invention.

FIG. 22 shows a preferred embodiment of a device according to the invention. The apparatus is made of two semiconductor multi-mode-laser sources 11 and 12 with two continuous-wave outputs. The semiconductor lasers are preferably multi-mode quantum cascade lasers, preferably operated in a comb regime. Other preferred operation regime of the quantum cascade laser is a comb-like regime. Other preferred operation of the quantum cascade laser is in a multi-mode Fabry-Pérrot regime. The outputs of the multi-mode lasers are preferably linearly polarized. The output passes preferably through an optical isolator unit 15. The multimode laser sources are physically separated. The laser beams are collimated with preferably refractive or reflective optical elements as beam combiner 13. Only one colli-mated laser beam is passing the sample. When a gaseous sample is measure, the sample is preferably placed in an optical gas-cell as absorption cell 25, preferably a multi-pass cell. When a liquid sample is measured, the sample is preferably placed in an optical liquid cell. Any window in the beam path is preferably placed at Brewster-angle to reduce feedback. Optical beam splitters are preferably wedged-beam splitters to reduce etalon effects. The two beams are combined afterwards on the detector 20 as well as on a reference detector 22 using the beam combiner 13. The fast detector is preferably a fast room-temperature MCT detector, preferably with a bandwidth between 100 kHz and 1 GHz. Other possibilities are to use cryogenically cooled MCT detectors or fast quantum-well infrared photodetectors. Any photodetector suitable to detect light in the frequency range of the multimode source with a suitable bandwidth can be used.

The control unit 21 controls the temperature, laser device current of both lasers 11 and 12. The control unit 21 is preferably computer controlled. Laser driver are preferably low noise laser drivers. Temperature controller is preferably a temperature controller based on thermistor readout. The preferable temperature stability is 1 mK or less. The optical isolator unit 15 serves to reduce optical feedback on the semiconductor multimode-laser. A preferable implementation is a quarter wave plate. Other preferable implementation is optical isolators 15 based on faraday rotators. The data-acquisition unit is preferably a fast analog-to-digital converter, preferably with a resolution of 16 bit or more. The data-acquisition unit 23 connected with the detector 20 and the reference detector 22 has a minimum resolution of 8 bit. Other preferable data-acquisition unit 23 is a sweep or real-time spectrum analyzer. The data treatment unit 24 is based on a hardware computation unit. Preferable implementations include solutions based on FGPA/GPU/CPU. The data-treatment unit 24 is preferably computer controlled. The computer controlling the data-treatment 24 is preferably the same controlling the control unit 21.

The unit according to FIG. 22 comprises a supplementary second reference path, including a reference detector 22. The reference path generates a reference multi-heterodyne beat, which can be recorded on the reference detector 22. The second reference detector 22 active area is preferably the same size with the same electronics as the first detector 20. This is important to have similar noise and bandwidth characteristics for both detectors 20 and 22. The sampling on the data acquisition unit 23 is done synchronously for both detectors 20 and 22. The arrangement with a second reference path allows reducing technical noise. Both optical paths to the detector 20 and reference detector 22 are preferably the same length.

Figure 23:
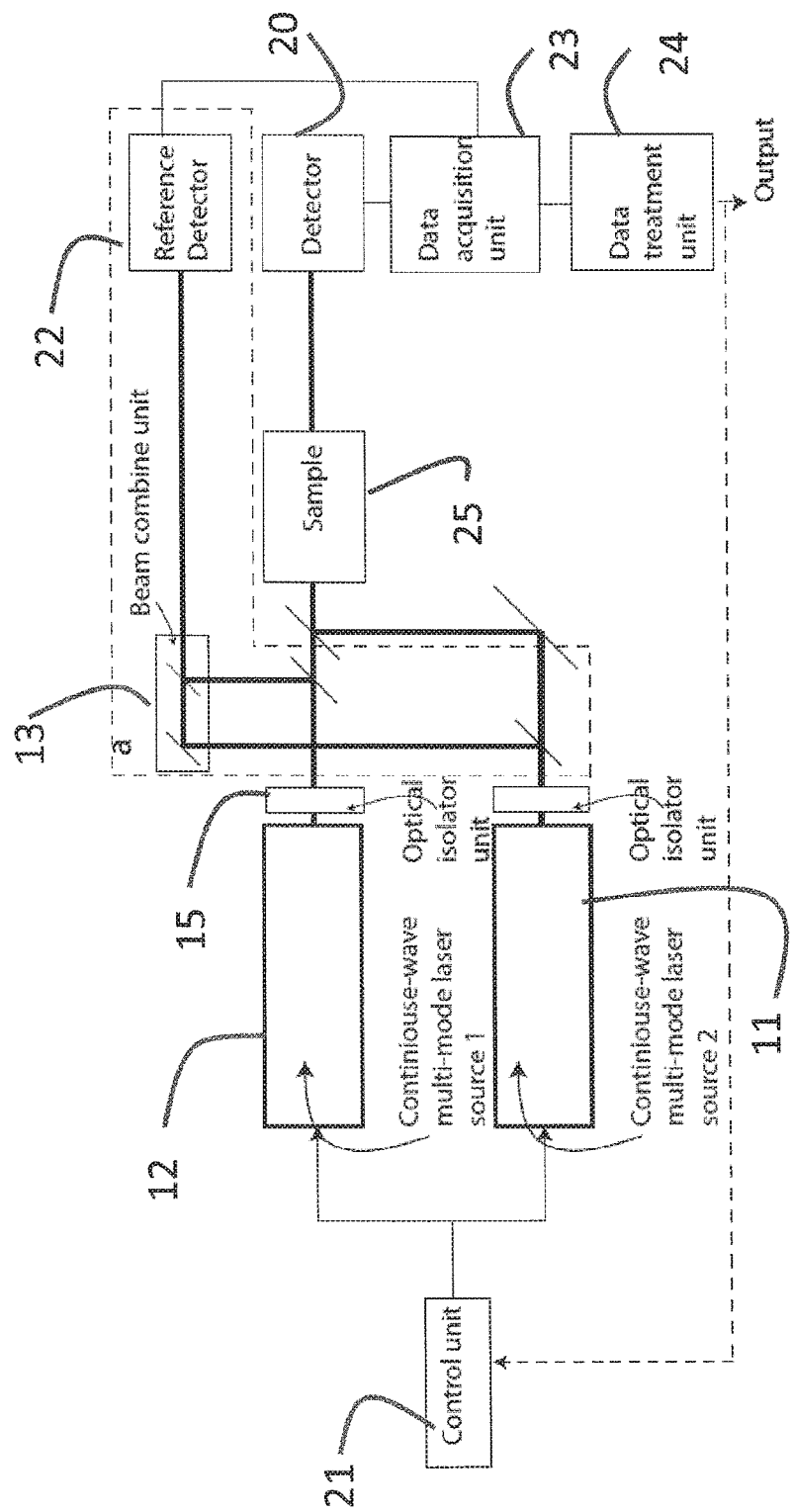
FIG. 23 shows a further preferred implementation of a device according to an embodiment of the invention.

FIG. 23 shows another preferred embodiment. The difference between the preferred embodiment shown in FIG. 22 is the beam path of the second semiconductor source with a multi-mode output. Similar or identical features receive in all drawings similar or identical reference numerals. In this arrangement, both laser beams pass the sample. This has the advantage of an increased signal absorption, and therefore a better signal-to-noise ratio, since both laser beams are affected by the sample. However, the resolution of the final measurement is less, since any measured signal variation in the multi-heterodyne signal might originate from either laser. This prohibits a clear mapping of the measured feature to an exact optical frequency.

Figure 24:
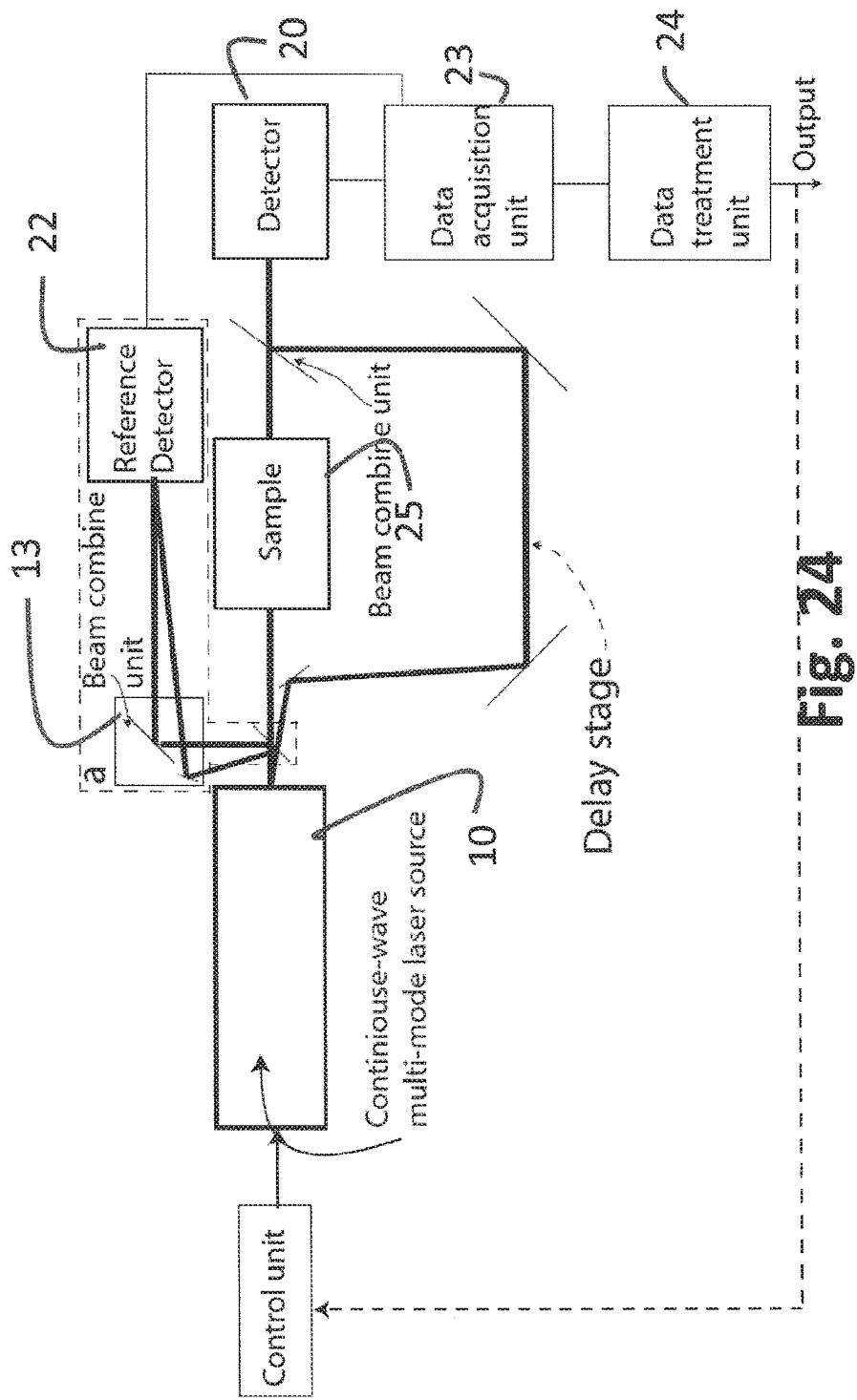
FIG. 24 shows a further implementation of a device according to an embodiment of the invention.

FIG. 24 provides a drawing of a further implementation of the proposed device. The device or apparatus is made of one continuous wave (cw) laser source 10 providing output as for two multimode-laser sources with two continuous-wave outputs. By generating a ramp current with the control unit and a delay stage, it is possible to generate a heterodyne signal at the detector with a single continuous wave source. The delay stage can be implemented by mirrors or a multi-pass cell or preferably generated by an optical fiber. Only one laser beam is passing the sample 25. The two beams are combined afterwards on the detector 20 and reference detector 22.

Figure 25:
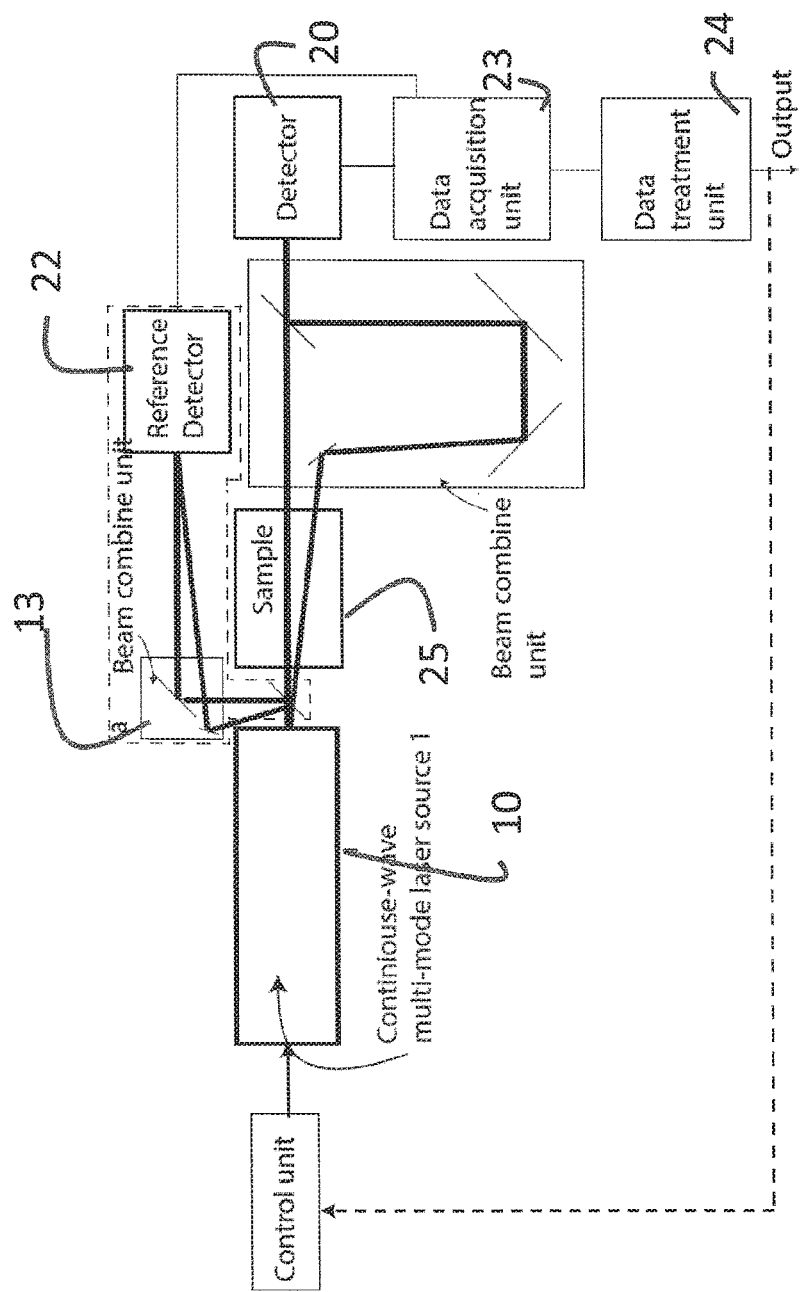
FIG. 25 shows a further implementation of a device according to an embodiment of the invention.

FIG. 25 shows a further implementation of the proposed device. The apparatus or device is made of one cw laser source 10 providing output as for two multimode-laser sources with two continuous-wave outputs by providing a ramp function generator 28. Both laser beams are passing the sample cell 25. The two beams are combined afterwards on the detector 20 and reference detector 22.

LIST OF REFERENCE SIGNS

| | |
|---|---|
| 10 | laser source |
| 11 | first laser (LO laser) |
| 12 | second laser |
| 13 | optical combining element/beam combiner |
| 15 | optical isolator units (quarter wave plate or Faraday rotator) |
| 20 | detector |
| 21 | control unit |
| 22 | reference detector |
| 23 | data acquisition unit |
| 24 | data treatment unit |
| 25 | absorption cell |
| 28 | ramp function generator |
| 40 | absorption line in RF-domain |
| 41 | dip |
| 42 | tuned absorption signal in RF-domain |
| 43 | laser mode |
| 50 | tuning |
| 55 | detector bandwidth |
| 140 | absorption line in optical domain |
| $f_n$ | optical frequency of mode n |
| $f_{ceo}$ | carrier offset frequency |
| $f_{rep}$ | optical repetition frequency |
| $\Delta f_{rep}$ | difference in repetition frequency |

The invention claimed is:

1. A method for optical and electrical signal processing of a multi-heterodyne signal generated by at least one multi-mode semi-conductor laser, the method comprising the steps of:
providing a first laser source;
providing a second laser source;
providing a sample interaction unit;
providing a detector;
directing at least a beam of one of the first laser source and the second laser source through the sample interaction unit;
combining beams of the first laser source and the second laser source on the detector after at least the beam of the one of the first laser source and the second laser source has passed the sample interaction unit;
adjusting both the first laser source and the second laser source to overlap a spectrum of the first laser source and the second laser source allowing a heterodyne signal between the first laser source and the second laser source to be located in a bandwidth of the detector; and
generating the heterodyne signal in the bandwidth of the detector, and repeatedly executing the following tuning steps a predetermined number of times for reconstructing a sample spectrum:
tuning the first laser source, wherein the first laser source is only tuned by an amount keeping a tuning result within the bandwidth of the detector; and
tuning the second laser source by a similar amount as the tuning of the first laser source to bring back the heterodyne signal within the bandwidth of the detector.

2. The method according to claim 1, wherein after the step of tuning the first laser source and before the step of tuning the second laser source, a further step is performed in tracking of the heterodyne signal in an RF-domain to determine an extent of the tuning of the first laser source.

3. The method according to claim 1, wherein the repeated tuning of the first laser source as well as the tuning of the second laser source is performed at the same time.

4. The method according to claim 1, wherein the heterodyne signal of the detector is truncated, before the tuning steps are finished, into individual time-slices, wherein these individual time slices are transferred to a frequency domain to generate individual multi-heterodyne spectra and averaged to improve a signal-to-noise ratio.

5. The method according to claim 4, wherein the individual time slices are equally spaced.

6. The method according to claim 4, comprising a step of, prior to averaging the individual time-slices to reduce the signal-to-noise ratio, aligning individual truncated multi-heterodyne spectra or priorly averaged subsets of multi-heterodyne spectra in the frequency domain in order to correct any possible drift and dither.

7. The method according to claim 1, wherein optical repetition frequencies of both the first laser source and the second laser source are measured, and wherein subsequently either the first laser source or the second laser source is tuned by a predetermined amount, and following that a shift direction in the heterodyne signal is observed.

8. The method according to claim 7, wherein the predetermined amount is between 100 kHz and 1 GHz.

9. The method according to claim 1, wherein tuning the second laser source is performed to a predetermined amount similar to the amount of the tuning of the first laser source to bring back the heterodyne signal to a vicinity of original place in a RF-domain within the bandwidth of the detector.

10. A method for optical and electrical signal processing of a multi-heterodyne signal generated by at least one multi-mode semi-conductor laser, comprising steps of:
providing a first laser source;
providing a second laser source;
providing a sample interaction unit;
providing a detector;
directing at least one beam of one of the first and second laser sources through the sample interaction unit;
combining beams of the first and second laser sources on the detector after the at least one beam of one of the first laser source and the second laser source has passed the sample interaction unit;
acquiring a heterodyne signal on the detector and truncating it into individual time-slices, wherein these individual time-slices are transferred to a frequency domain to generate individual multi-heterodyne spectra; and aligning, prior to averaging individual multi-heterodyne spectra time-slices to reduce a signal-to-noise ratio, individual truncated multi-heterodyne spectra or priorly averaged subsets of multi-heterodyne spectra in the frequency domain in order to correct any possible drift and dither.

11. The method according to claim 10, wherein the individual time-slices are equally spaced.

12. An apparatus generating a multi-heterodyne signal, comprising:
- at least one multimode-laser source with at least two continuous-wave outputs featuring two optical repetition frequencies having a difference between these optical repetition frequencies;
- at least one detector to detect laser radiation from the at least two continuous-wave outputs;
- at least one beam combiner to combine the at least two continuous-wave outputs on the same detector generating a heterodyne signal in a bandwidth of the detector;
- at least one sample interaction unit positioned for directing at least one beam of one of the two continuous-wave outputs through the sample interaction unit;
- a data acquisition unit for every detector for sampling the heterodyne signal from the detector at a constant sampling rate;
- at least one control unit controlling laser sources as well as the data acquisition unit(s) for repeatedly tuning a predetermined number of times for reconstructing a sample spectrum;
- wherein the at least one multimode-laser source comprises a semiconductor source experiencing drifts and dither; and
- wherein the constant sampling rate is not coherently linked to a repetition rate of the laser sources.

13. The apparatus according to claim 12, wherein the data acquisition unit is capable of frequency and/or amplitude demodulating the heterodyne signal.

14. The apparatus according to claim 12, wherein all laser sources are multi-mode QCL lasers.

15. The apparatus according to claim 14, wherein the multi-mode QCL lasers are operated in a comb regime or a comb-like regime.

16. The apparatus according to claim 12, wherein an acquired sample length is limited and wherein the heterodyne signal is truncated into a number of individual time-slices.

17. The apparatus according to claim 16, wherein the heterodyne signal is truncated into equally spaced, partially overlapping time-slices.

18. The apparatus according to claim 16, wherein truncated data is windowed before transforming it to a frequency domain by a discrete Fourier transform algorithm.

19. The apparatus according to claim 18, wherein a window used in windowing is a flat top window or a boxcar.

20. The apparatus according to claim 19, wherein truncated and windowed data is subsequently converted into a Fourier-domain using a DFT.

21. The apparatus according to claim 20, wherein the Fourier-domain is using a FFT.

22. The apparatus according to claim 12, wherein the data acquisition unit is sampling the heterodyne signal continuously.

23. The apparatus according to claim 22, wherein the heterodyne signal is continuously truncated in individual time-slices.

24. The apparatus according to claim 12, which prior to averaging individual multi-heterodyne spectra time slices to reduce a signal-to-noise ratio, individual multi-heterodyne spectra or priorly averaged subsets of multi-heterodyne spectra are aligned in a frequency domain.

25. The apparatus according to claim 12, wherein the at least one sample interaction unit is an absorption cell or a multi-pass absorption cell.

26. The apparatus according claim 12, wherein a measured multi-heterodyne frequency spacing is compared to the heterodyne signal spaced by the difference between these optical repetition frequencies, wherein one or more of amplitude and frequency spacings are measured.

27. The apparatus according to claim 12, further comprising: at least one beam divisor unit adapted to divide one continuous-wave output into at least two multimode-laser beams, traveling different paths having different optical path lengths, wherein the at least one sample interaction unit is provided within at least one of the paths, and wherein the at least one beam combiner combines the at least two multimode-laser beams into a single beam.

* * * * *